(12) United States Patent
Singhal et al.

(10) Patent No.: US 7,509,431 B2
(45) Date of Patent: Mar. 24, 2009

(54) PERFORMING MESSAGE AND TRANSFORMATION ADAPTER FUNCTIONS IN A NETWORK ELEMENT ON BEHALF OF AN APPLICATION

(75) Inventors: Pravin Singhal, Cupertino, CA (US); Qingqing Li, San Jose, CA (US); Juzar Kothambawala, Cupertino, CA (US); Parley Van Oleson, San Jose, CA (US); Wai Yip Tung, San Francisco, CA (US); Sunil Potti, Castro Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 10/991,792

(22) Filed: Nov. 17, 2004

(65) Prior Publication Data

US 2006/0106941 A1     May 18, 2006

(51) Int. Cl.
*G06F 15/16* (2006.01)

(52) U.S. Cl. ..................................................... 709/230

(58) Field of Classification Search ......... 709/245–246, 709/230, 238; 370/467; 719/328, 313
See application file for complete search history.

(56) References Cited

U.S. PATENT DOCUMENTS

| | | | |
|---|---|---|---|
| 5,790,542 A | 8/1998 | Kim et al. | |
| 6,021,135 A | 2/2000 | Ishihara et al. | |
| 6,115,378 A | 9/2000 | Hendel et al. | |
| 6,145,079 A | 11/2000 | Mitty et al. | |
| 6,341,130 B1 | 1/2002 | Lakshman et al. | |
| 6,356,951 B1 | 3/2002 | Gentry | |
| 6,510,434 B1 | 1/2003 | Anderson et al. | |
| 6,510,464 B1 | 1/2003 | Grantges et al. | |
| 6,587,431 B1 | 7/2003 | Almulhem et al. | |
| 6,597,918 B1 | 7/2003 | Kim | |

(Continued)

FOREIGN PATENT DOCUMENTS

WO     WO 03/021465 A1     3/2003

OTHER PUBLICATIONS

Marc Girardot and Neel Sundaresan. Millau: an encoding format for efficient representation and exchange for XMLover the web. [retrieved Jan. 31, 2005]. Retrieved from the internet: <URL: http://www9.org/w9cdrom/154/154.html>.

(Continued)

*Primary Examiner*—Salad Abdullah
(74) *Attorney, Agent, or Firm*—Hickman Palermo Truong & Becker LLP

(57) ABSTRACT

A method is disclosed for performing message and transformation adapter functions in a network element on behalf of an application. According to one aspect, the network element determines an application layer message that is collectively contained in payload portions of data packets. The application layer message conforms to an application layer protocol, such as Hypertext Transfer Protocol (HTTP). The network element determines the application layer protocol to which the application layer message conforms. Based on the application layer protocol, an adapter is selected from among a plurality of adapters that are accessible to the network element. The application layer message is provided to the selected adapter, which converts the application layer message into a "canonical" message that is not specific to any particular application layer protocol.

36 Claims, 28 Drawing Sheets

U.S. PATENT DOCUMENTS

| | | | | |
|---|---|---|---|---|
| 6,678,827 | B1* | 1/2004 | Rothermel et al. | 726/6 |
| 6,683,881 | B1* | 1/2004 | Mijares et al. | 370/401 |
| 6,718,326 | B2 | 4/2004 | Uga et al. | |
| 6,745,041 | B2* | 6/2004 | Allison et al. | 455/466 |
| 6,772,211 | B2 | 8/2004 | Lu et al. | |
| 6,772,223 | B1 | 8/2004 | Corl, Jr. et al. | |
| 6,785,732 | B1 | 8/2004 | Bates et al. | |
| 6,792,002 | B2 | 9/2004 | Tezuka et al. | |
| 6,816,455 | B2 | 11/2004 | Goldberg et al. | |
| 6,965,599 | B1 | 11/2005 | Sakurai et al. | |
| 6,996,842 | B2 | 2/2006 | Strahm et al. | |
| 7,092,505 | B2* | 8/2006 | Allison et al. | 379/229 |
| 7,111,076 | B2 | 9/2006 | Abjanic et al. | |
| 7,111,163 | B1 | 9/2006 | Haney | |
| 7,126,907 | B2 | 10/2006 | Carpini et al. | |
| 7,149,222 | B2 | 12/2006 | Wiryaman et al. | |
| 7,181,537 | B2* | 2/2007 | Costa-Requena et al. | 709/246 |
| 7,185,365 | B2 | 2/2007 | Tang et al. | |
| 7,215,641 | B1 | 5/2007 | Bechtolsheim et al. | |
| 7,239,634 | B1 | 7/2007 | Chakravorty | |
| 7,245,620 | B2 | 7/2007 | Shankar | |
| 7,296,268 | B2 | 11/2007 | Darling et al. | |
| 7,299,361 | B1 | 11/2007 | Kim et al. | |
| 7,362,763 | B2 | 4/2008 | Wybenga et al. | |
| 7,363,353 | B2 | 4/2008 | Ganesan et al. | |
| 7,376,755 | B2 | 5/2008 | Pandya | |
| 2002/0126672 | A1 | 9/2002 | Chow et al. | |
| 2002/0136403 | A1 | 9/2002 | Henson et al. | |
| 2002/0161907 | A1 | 10/2002 | Moon | |
| 2002/0165957 | A1 | 11/2002 | Devoe et al. | |
| 2002/0194342 | A1 | 12/2002 | Lu et al. | |
| 2002/0194345 | A1 | 12/2002 | Lu et al. | |
| 2002/0194350 | A1 | 12/2002 | Lu et al. | |
| 2003/0018726 | A1 | 1/2003 | Low et al. | |
| 2003/0028599 | A1* | 2/2003 | Kolsky | 709/206 |
| 2003/0095569 | A1* | 5/2003 | Wengrovitz et al. | 370/467 |
| 2003/0095596 | A1 | 5/2003 | Wengrovitz et al. | |
| 2003/0105903 | A1 | 6/2003 | Garnett et al. | |
| 2003/0112802 | A1 | 6/2003 | Ono et al. | |
| 2003/0112809 | A1 | 6/2003 | Bharali et al. | |
| 2003/0115448 | A1 | 6/2003 | Bouchard | |
| 2004/0001444 | A1 | 1/2004 | Sadot et al. | |
| 2004/0032881 | A1* | 2/2004 | Arai | 370/466 |
| 2004/0054886 | A1 | 3/2004 | Dickinson et al. | |
| 2004/0088585 | A1 | 5/2004 | Kaler et al. | |
| 2004/0121789 | A1* | 6/2004 | Lindsey | 455/517 |
| 2004/0133775 | A1 | 7/2004 | Callas et al. | |
| 2004/0136371 | A1 | 7/2004 | Muralidhar et al. | |
| 2004/0167986 | A1* | 8/2004 | Gilfix et al. | 709/230 |
| 2004/0170182 | A1 | 9/2004 | Higashida et al. | |
| 2004/0205336 | A1 | 10/2004 | Kessler et al. | |
| 2004/0221319 | A1 | 11/2004 | Zenoni | |
| 2004/0267920 | A1 | 12/2004 | Hydrie et al. | |
| 2005/0021836 | A1 | 1/2005 | Reed et al. | |
| 2005/0050362 | A1 | 3/2005 | Peles | |
| 2005/0063377 | A1 | 3/2005 | Bryant et al. | |
| 2005/0071508 | A1 | 3/2005 | Brown et al. | |
| 2005/0117576 | A1 | 6/2005 | McDysan et al. | |
| 2005/0165828 | A1 | 7/2005 | Lango et al. | |
| 2005/0216727 | A1 | 9/2005 | Chattopadhyay et al. | |
| 2006/0031374 | A1 | 2/2006 | Lu et al. | |
| 2006/0123226 | A1 | 6/2006 | Kumar et al. | |
| 2006/0123467 | A1 | 6/2006 | Kumar et al. | |
| 2006/0123479 | A1 | 6/2006 | Kumar et al. | |
| 2006/0129650 | A1 | 6/2006 | Ho et al. | |
| 2006/0129689 | A1 | 6/2006 | Ho et al. | |
| 2006/0146879 | A1 | 7/2006 | Anthias et al. | |
| 2006/0155862 | A1 | 7/2006 | Kathi et al. | |
| 2006/0167975 | A1 | 7/2006 | Chan et al. | |
| 2006/0168334 | A1 | 7/2006 | Potti et al. | |

OTHER PUBLICATIONS

Fujitsu Limited, et al.. Web Services Reliability (WS-Reliability). Ver1.0. Jan. 8, 2003. pp. 1-45.

Ruslan Bilorusets et al.. Web Services Reliable Messaging Protocol (WS-ReliableMessaging). Mar. 2004.

International Searching Authority, "Notification of Transmittal of the International Search Report and the Written Opinion of the International Searching Authority, or the Declaration," PCT/US05/44171, dated Nov. 30, 2006, 7 pages.

Current Claims, PCT/US05/44171, 9 pages.

International Searching Authority, "Notification of Transmittal of the International Search Report and the Written Opinion of the International Searching Authority, or the Declaration," PCT/US2006/024375, dated Oct. 17, 2006, 10 pages.

Current Claims, PCT/US2006/024375, 6 pages.

DeCasper, Dan et al., "Router Plugins: A Software Architecture for Next-Generation Routers," IEEE ACM Transactions on Networking, vol. 9, No. 1, Feb. 2000, XP011038838, 14 pages.

International Searching Authority, "Notification of Transmittal of the International Search Report and the Written Opinion of the International Searching Authority, or the Declaration," PCT/US05/43599, dated Feb. 28, 2007, 8 pages.

Current Claims, PCT/US05/43599, 8 pages.

International Searching Authority, "Notification of Transmittal of the International Search Report and the Written Opinion of the International Searching Authority, or the Declaration," PCT/US05/41254, dated Mar. 28, 2007, 7 pages.

Current Claims, PCT/US05/41254, 11 pages.

International Searching Authority, "Notification of Transmittal of the International Search Report and the Written Opinion of the International Searching Authority, or the Declaration," PCT/US05/45625, dated Oct. 20, 2006, 7 pages.

Current Claims PCT/US05/45625, 9 pages.

International Searching Authority, "Notification of Transmittal of the International Search Report and the Written Opinion of the International Searching Authority, or the Declaration," PCT/US05/40861, dated Nov. 17, 2006, 7 pages.

Current Claims PCT/US05/40861, 6 pages.

International Searching Authority, "Notification of Transmittal of the International Search Report and the Written Opinion of the International Searching Authority, or the Declaration", International application No. PCT/US05/46149, dated Jul. 20, 2007, 9 pages.

Claims, International application No. PCT/US05/46149, 10 pages.

Burns, Michael, et al., "Implementing Address Assurance in the Intel IXP Router", Western Network Processors Conference, Oct. 2002, 17 pages.

State Intellectual Property Office of the People's Republic of China "The First Office Action" mailed Jun. 27, 2008, Serial No. 200580031604.01, Applicant Cisco Technology, Inc.; 15 pages.

Girardot, Marc, et al., "Millau: An Encoding Format for Efficient Representation and Exchange of XML Over the Web", Computer Networks, Netherlands, vol. 33, Jun. 2000, 22 pages.

* cited by examiner

200

202
DETERMINE, AT A NETWORK ELEMENT, AN APPLICATION LAYER PROTOCOL-CONFORMANT APPLICATION LAYER MESSAGE THAT IS COLLECTIVELY CONTAINED IN PAYLOAD PORTIONS OF DATA PACKETS

204
DETERMINE THE APPLICATION LAYER PROTOCOL TO WHICH THE APPLICATION LAYER MESSAGE CONFORMS

206
SELECT, BASED ON THE APPLICATION LAYER PROTOCOL, A PARTICULAR ADAPTER FROM AMONG A PLURALITY OF ADAPTERS THAT ARE ACCESSIBLE TO THE NETWORK ELEMENT

208
PROVIDE THE APPLICATION LAYER MESSAGE TO THE PARTICULAR ADAPTER, WHICH CONVERTS THE APPLICATION LAYER MESSAGE INTO A CANONICAL MESSAGE THAT DOES NOT CONFORM TO THE APPLICATION LAYER PROTOCOL

FIG. 2

PERFORMING MESSAGE AND TRANSFORMATION ADAPTER FUNCTIONS IN A NETWORK ELEMENT ON BEHALF OF AN APPLICATION

FIELD OF THE INVENTION

The present invention generally relates to network elements in computer networks. The invention relates more specifically to a method and apparatus for performing message and transformation adapter functions in a network element on behalf of an application.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a business-to-business environment, applications executing on computers commonly communicate with other applications that execute on other computers. For example, an application "A" executing on a computer "X" might send, to an application "B" executing on a computer "Y," a message that indicates the substance of a purchase order.

Computer "X" might be remote from computer "Y." In order for computer "X" to send the message to computer "Y," computer "X" might send the message through a computer network such as a local area network (LAN), a wide-area network (WAN), or an inter-network such as the Internet. In order to transmit the message through such a network, computer "X" might use a suite of communication protocols. For example, computer "X" might use a network layer protocol such as Internet Protocol (IP) in conjunction with a transport layer protocol such as Transport Control Protocol (TCP) to transmit the message.

Assuming that the message is transmitted using TCP, the message is encapsulated into one or more data packets; separate portions of the same message may be sent in separate packets. Continuing the above example, computer "X" sends the data packets through the network toward computer "Y." One or more network elements intermediate to computer "X" and computer "Y" may receive the packets, determine a next "hop" for the packets, and send the packets towards computer "Y."

For example, a router "U" might receive the packets from computer "X" and determine, based on the packets being destined for computer "Y," that the packets should be forwarded to another router "V" (the next "hop" on the route). Router "V" might receive the packets from router "U" and send the packets on to computer "Y." At computer "Y," the contents of the packets may be extracted and reassembled to form the original message, which may be provided to application "B." Applications "A" and "B" may remain oblivious to the fact that the packets were routed through routers "U" and "V." Indeed, separate packets may take different routes through the network.

A message may be transmitted using any of several application layer protocols in conjunction with the network layer and transport layer protocols discussed above. For example, application "A" may specify that computer "X" is to send a message using Hypertext Transfer Protocol (HTTP). Accordingly, computer "X" may add HTTP-specific headers to the front of the message before encapsulating the message into TCP packets as described above. If application "B" is configured to receive messages according to HTTP, then computer "Y" may use the HTTP-specific headers to handle the message.

In addition to all of the above, a message may be structured according to any of several message formats. A message format generally indicates the structure of a message. For example, if a purchase order comprises an address and a delivery date, the address and delivery date may be distinguished from each other within the message using message format-specific mechanisms. For example, application "A" may indicate the structure of a purchase order using Extensible Markup Language (XML). Using XML as the message format, the address might be enclosed within "<address>" and "</address>" tags, and the delivery date might be enclosed within "<delivery-date>" and "</delivery-date>" tags. If application "B" is configured to interpret messages in XML, then application "B" may use the tags in order to determine which part of the message contains the address and which part of the message contains the delivery date.

Often, though, different applications are designed to use different application layer protocols to send and receive messages. For example, application "A" might be designed to send messages using only HTTP, but application "B" might be designed to receive messages using only File Transfer Protocol (FTP), another application layer protocol. Furthermore, different applications may be designed to use different message formats to format and interpret messages. For example, application "A" might be designed to format messages using only XML, but application "B" might be designed to interpret messages using only Electronic Data Interchange (EDI).

Usually, it is not practical or even possible to design or update an application so that the application can converse with other applications using all possible message formats and application layer protocols. Some message formats and application layer protocols may be proprietary and not publicly disclosed. Some message formats and application layer protocols may be relatively new and obscure. Some message formats and application layer protocols may be so old as to be considered generally obsolete.

In conventional practice, routers, switches, and other intermediary network elements route or switch individual frames, data grams, and packets without any knowledge, awareness, or processing of the higher-order application layer messages embodied in flows of packets. In order to reduce the amount of application modification required-to allow an application to converse with other applications that might use different message formats and/or application layer protocols, intermediary network elements separate from such applications may be designed to receive messages explicitly sent to those network elements, "translate" the messages, and then send the messages. This translation may be achieved by looking for a specified bit pattern beginning at a specified bit location in a packet, and then altering bits at the specified bit location if the specified bit pattern is found. For example, a network appliance "J" might be designed to receive messages that have been sent using HTTP and send those messages using FTP instead. For another example, a network appliance "K" might be designed to receive messages that are in XML format and translate those messages into EDI format. Thus, if application "A" sends messages in XML using HTTP, and application "B" receives messages in EDI using FTP, then application "A" can be configured so that messages that application "A" normally would address to application "B" are addressed to network appliance "J" instead. The network administrator can configure network appliance "J" to send messages to network appliance "K," and the network administrator can configure network appliance "K" to send messages to application "B."

Unfortunately, this approach requires a lot of effort from the network administrator. As the number of possible different application layer protocols and message formats used by communicating applications increases, the number of network appliances and paths between those network appliances rises dramatically. For each pair of sending and receiving applications, a network administrator following this approach must configure the applications and network appliances involved to ensure that the messages will follow the correct path through the relevant network appliances. Thus, if each of applications "A," "B," "C," "D," and "E" needed to communicate with each other, the network administrator following this approach might need to configure 25 different "paths" of one or more network appliances each. As applications are added, removed, and modified, the network administrator may need to add and/or remove certain network appliances from certain paths between application pairs. When many applications are involved, the burden can be more than most network administrators can bear.

Additionally, if multiple paths are configured to contain the same network appliance, then the network appliance may become a bottleneck that degrades network performance.

Thus, this "pair-wise path configuration" approach is impractical when applied to systems in which large numbers of diverse applications communicate. A more practical technique for allowing a multitude of diverse applications to communicate is needed.

Furthermore, existing intermediary network elements are limited in the kinds of processing that those network elements can perform on packets, and in the kinds of actions that those network elements can perform relative to packets. Typically, an existing intermediary network element performs only a single specialized operation relative only to data packets that possess matching parameters in those data packets' headers. Both the parameters and the operation are typically fixed and cannot be customized by an end user. A technique for allowing a greater number and variety of customizable operations to be performed relative to data flows is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts a flow diagram that illustrates an overview of one embodiment of a network element-implemented method of converting application layer protocol-conformant messages into "canonical" messages that are application layer protocol-independent;

DETAILED DESCRIPTION

Figure 1:
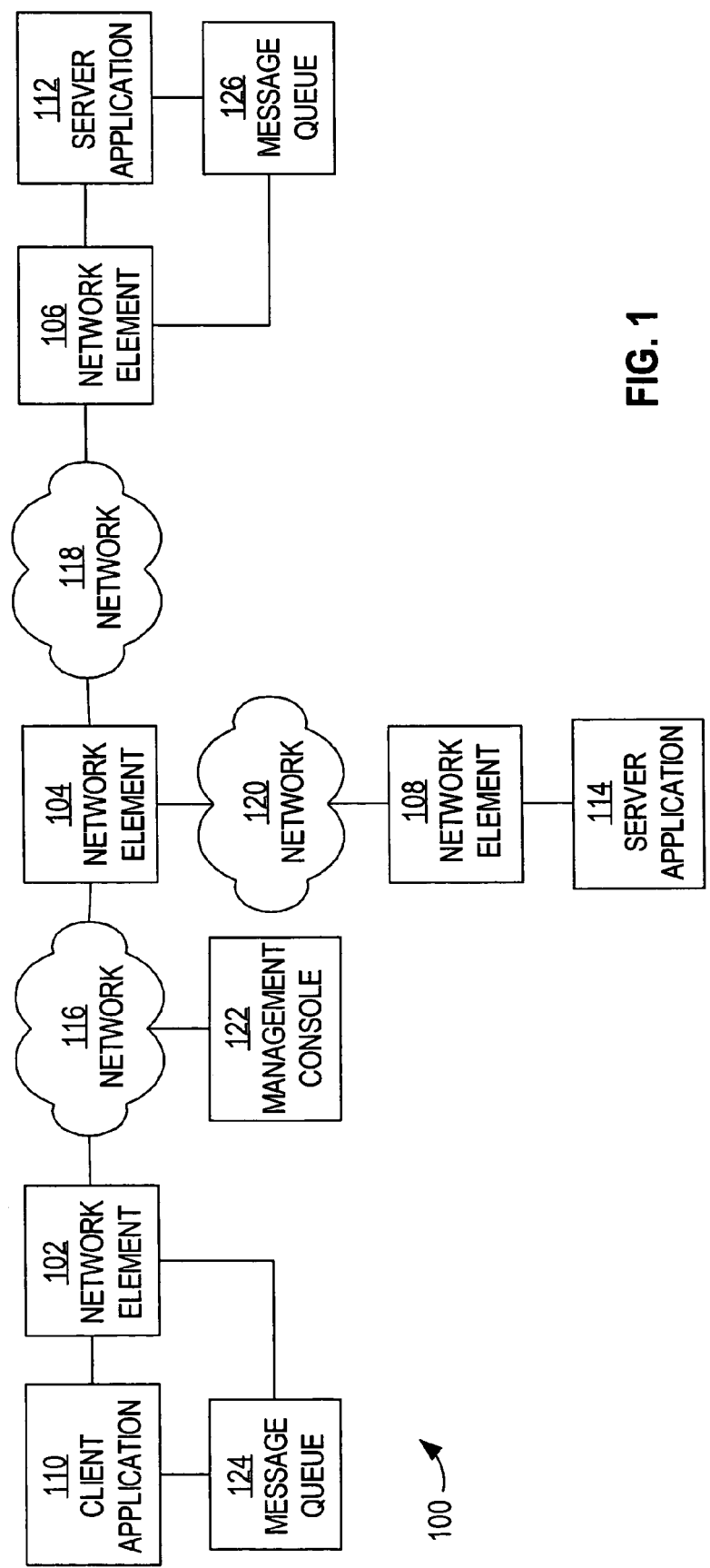
FIG. 1 is a block diagram that illustrates an overview of one embodiment of a system in which one or more network elements convert application layer protocol-conformant messages into "canonical" messages that that are application layer protocol-independent.

A method and apparatus for performing message and transformation adapter functions in a network element on behalf of an application is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Examples
   3.1 Retrieving Messages From A Message Queue
   3.2 Inserting Messages Into A Message Queue
   3.3 Programmable Adapters
   3.4 Multi-Blade Architecture
   3.5 Classifying Messages
   3.6 Action Flows
   3.7 AONS Examples
      3.7.1 AONS General Overview
      3.7.2 AONS Terminology
      3.7.3 AONS Functional Overview
      3.7.4 AONS System Overview
      3.7.5 AONS System Elements
      3.7.6 AONS Example Features
      3.7.7 AONS Functional Modules 3.7.8 AONS Modes of Operation
3.7.9 AONS Message Routing
3.7.10 Flows, Bladelets™, and Scriptlets™
3.7.11 AONS Services
3.7.12 AONS Configuration and Management
3.7.13 AONS Monitoring
3.7.14 AONS Tools
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for performing message and transformation adapter functions in a network element, such as a network router, on behalf of an application. According to one embodiment, the network element determines an application layer message that is collectively contained in payload portions of data packets. The application layer message conforms to an application layer protocol, such as HTTP. The network element determines the application layer protocol to which the application layer message conforms.

Based on the application layer protocol, an adapter is selected from among a plurality of adapters that are accessible to the network element. The application layer message is provided to the selected adapter, which converts the application layer message into a "canonical" message that is not specific to any particular application layer protocol. Because the canonical message is generic in that is does not conform to any particular application layer protocol, the network element can perform specified transformation operations relative to the canonical message without regard to the application layer protocol that was originally used to communicate the application layer message.

According to one aspect, user-customized program code that implements an adapter, as described above, is received at and stored at the network element. Thus, a network element can be provisioned with a customized adapter that converts application layer messages that conform to proprietary application layer protocols into canonical messages as described above; the network element may be "programmable" in this manner.

According to one aspect, the data packets that contain the application layer messages are intercepted by the network element, so that the application that sent the data packets does not need to be "aware" of the presence of the network element; the data packets may be addressed to a destination application that is hosted on a device other than the network element.

According to one aspect, the network element proactively reads application layer messages from a message queue, or other data repository, to which an application expressly or implicitly stored the application layer messages. The message queue may be external to the network element. According to one aspect, the network element converts the canonical messages, as described above, into application layer messages, and sends such application layer messages toward broker mechanisms that store the application layer messages into remote destination message queues from which remote destination applications may read the application layer messages.

In other aspects, the invention encompasses a computer apparatus and a computer-readable medium configured to carry out the foregoing steps.

2.0 Structural and Functional Overview

FIG. 1 is a block diagram that illustrates an overview of one embodiment of a system 100 in which one or more of network elements 102, 104, 106, and 108 convert application layer protocol-conformant messages into "canonical" messages that are application layer protocol-independent. Network elements 102, 104, 106, and 108 may be proxy devices, packet switches, or network routers such as router 600 depicted in FIG. 6 below, for example.

Client application 110 is coupled communicatively with network element 102. A server application 112 is coupled communicatively to network element 106. A server application 114 is coupled communicatively to network element 108. Client application 110 and server applications 112 and 114 may be separate processes executing on separate computers.

Network elements 102 and 104 are coupled communicatively with a network 116. Network elements 104 and 106 are coupled communicatively with a network 118. Network elements 104 and 108 are coupled communicatively with a network 120. Each of networks 116, 118, and 120 is a computer network, such as, for example, a local area network (LAN), wide area network (WAN), or internetwork such as the Internet. Networks 116, 118, and 120 may contain additional network elements such as routers.

According to one embodiment, client application 110 addresses messages to server applications 112 and 114. Network elements 102, 104, 106, and 108 intercept the data packets that contain the messages. Network elements 102, 104, 106, and 108 assemble one or more data packets to determine at least a portion of a message contained therein. Network elements 102, 104, 106, and 108 convert the application layer protocol-specific messages into canonical messages that are application layer protocol-independent. Based on the contents of the message, network elements 102, 104, 106, and 108 perform one or more actions. Examples of some of these actions are described in further detail below.

According to one embodiment, client application 110 inserts messages into message queue 124. For example, client application 110 may construct messages that conform to queue-based application layer protocols such as IBM MQ or TIBCO EMS, and insert those messages into message queue 124. Network element 102 may read and remove the messages from message queue 124, convert the application layer protocol-specific messages into canonical messages that are application layer protocol-independent, and, based on the contents of the messages, perform one or more actions.

In one embodiment, instead of expressly inserting messages into message queue 124, client application 110 sends messages to a message queue alias that is associated with message queue 126. Transparently to client application 110, messages sent to the message queue alias are actually stored in message queue 124 for later removal and transmission to message queue 126. Again, network element 102 may read and remove the messages from message queue 124, convert the application layer protocol-specific messages into canonical messages that are application layer protocol-independent, and, based on the contents of the messages, perform one or more actions, including sending the messages toward a broker mechanism that stores the messages into message queue 126 for retrieval by server application 112.

FIG. 2 depicts a flow diagram 200 that illustrates an overview of one embodiment of a network element-implemented method of converting application layer protocol-conformant messages into "canonical" messages that are application layer protocol-independent. Such a method may be performed, for example, by any of network elements 102, 104, 106, and 108.

In block 202, a network element determines, from payload portions of data packets, an application layer protocol-conformant application layer message that is collectively contained in the payload portions. For example, the data packets may collectively contain an HTTP-conformant application layer message. Network element 102 may intercept one or more data packets that are destined for server application 112; thus, the data packets might not be destined for network element 102.

For another example, network element 102 may retrieve, from message queue 124, an application layer message that client application 110 inserted, expressly or otherwise, into message queue 124. Such an application layer message might be IBM MQ-conformant or TIBCO EMS-conformant, for example. Network element 102 may request such an application layer message from a broker mechanism that manages message queue 124. In response, the broker mechanism may encapsulate the message into one or more data packets and send the data packets to network element 102.

Regardless of how network element 102 obtains the application layer message, network element 102 may assemble the contents of payload portions of data packets, such as TCP packets, to construct the application layer message contained therein.

In block 204, an application layer protocol to which the application layer message conforms is determined. For example, network element 102 may determine an application layer protocol, such as HTTP, FTP, SMTP, IBM MQ, or TIBCO EMS, to which the message conforms.

In one embodiment, mapping information stored at a network element, such as network element 102, indicates associations between TCP ports and application layer protocols. For example, TCP port 80 may be associated with HTTP, and other TCP ports may be associated with other application layer protocols. Multiple TCP ports may be associated with a single application layer protocol. In such an embodiment, the network element determines a message's application layer protocol by determining which application layer protocol is associated with the TCP port on which the data packets containing the message were received. For example, if a message was contained in TCP packets that network element 102 received on TCP port 80, then network element 102 may conclude that the message conforms to HTTP.

In block 206, a particular adapter is selected, based on the application layer protocol, from among a plurality of adapters that are accessible to the network element. Each adapter is a set of program code that is able to convert application layer messages that conform to a particular application layer protocol into canonical messages that do not conform to any specific application layer protocol. For example, network element 102 may store an adapter for HTTP, an adapter for FTP, an adapter for SMTP, an adapter for IBM MQ, an adapter for TIBCO EMS, and an adapter for a proprietary application layer protocol. If the application layer message is HTTP-conformant, then network element 102 selects the HTTP adapter. Alternatively, if the application layer message conforms to another application layer protocol, then network element 102 selects that adapter that corresponds to that protocol.

In block 208, the application layer message is provided to the particular adapter, which converts the application layer message into a canonical message that does not conform to the application layer protocol. For example, network element 102 may send an HTTP-conformant message to an HTTP adapter stored on network element 102. The HTTP adapter converts the HTTP-conformant message into a canonical message that does not conform to any particular application layer protocol.

In one embodiment, an adapter converts an application layer protocol-conformant message into a canonical message by removing, from the application layer protocol-conformant message, all information that is specific to the application layer protocol. For example, the conversion of an HTTP message into a canonical-message may involve the HTTP adapter stripping off the HTTP header from front of the HTTP message.

Once the message has been converted into the application layer protocol-independent canonical form, the network element may perform one or more actions on behalf of the application that generated the message. The actions performed may vary based on the contents of the message. Because the canonical message is application layer protocol-independent, the actions may be performed without regard for the application layer protocol that was used to communicate the message.

Based on the canonical message's contents, a message classification may be determined for the message. For example, network element 102 may determine, based on the message's contents, that the message is a purchase order-class message. In response, network element 102 may perform, on behalf of server application 112, one or more specified actions that are associated with purchase order-class messages. The specified actions may include, for example, modifying the message's format (e.g., from XML to EDI). Examples of other possible actions are described below.

One possible action that may be performed based on the message's classification is to convert the canonical message back into an application layer protocol-specific message and send the application layer protocol-specific message toward a specified destination. To convert a canonical message to an application layer protocol-specific message, a network element may provide the canonical message as input to the adapter that corresponds to the appropriate application layer protocol. For example, to convert a canonical message into an HTTP-conformant message, network element 102 may provide the canonical message to an HTTP adapter. After the HTTP adapter has converted the canonical message into an HTTP-conformant message, network element 102 may encapsulate the HTTP-conformant message into one or more data packets and send the data packets toward a specified destination, such as server application 112.

The application layer protocol to which a canonical message is converted may differ from the application layer protocol from which the canonical message was formerly derived. For example, network element 102 may receive an HTTP-conformant message, convert the HTTP-conformant message into a canonical message, perform actions based on the contents of the canonical message, convert the canonical message into an SMTP-conformant message, and sent the SMTP-conformant message toward server application 112.

3.0 Implementation Examples 3.1 Retrieving Messages From a Message Queue

According to one embodiment, instead of intercepting data packets that a client application has sent toward a server application, a network element proactively retrieves messages from a source message queue into which a client application has inserted the messages. For example, network element 102 may determine whether message queue 124 contains any messages. To perform this determination, network element 102 may query a broker mechanism that manages message queue 124.

In response to determining that message queue 124 contains a message, network element 102 retrieves the message from message queue 124 and removes the message from message queue 124. For example, network element 102 may instruct a broker mechanism to remove the message from message queue 124 and send the message to network element 102. In response, the broker mechanism may encapsulate the message into one or more data packets, such as TCP packets, and send the packets to network element 102.

The data packets may be sent on a particular TCP port that is associated with the application layer protocol to which the message conforms. For example, if the message conforms to IBM MQ, then the data packets may be sent on a TCP port that is associated with IBM MQ. Alternatively, if the message conforms to TIBCO EMS, then the data packets may be sent on a TCP port that is associated with TIBCO EMS. As is discussed above, network element 102 may determine the message's application layer protocol based on the TCP port, and send the message to the appropriate adapter.

3.2 Inserting Messages Into a Message Queue

In one embodiment, the actions that a network element may perform relative to a message include inserting the message into a destination message queue. For example, network element 106 may determine that a particular canonical message's classification is associated with an "insert into destination queue" action. In response, network element 106 may convert the particular canonical message into an application layer protocol-specific message, such as an IBM MQ-conformant message or a TIBCO EMS-conformant message, and insert the resulting application layer protocol-specific message into a specified message queue, such as message queue 126.

Network element 106 may convert the canonical message to the application layer protocol-specific message by providing the message as input to an adapter that corresponds to the appropriate application layer protocol, as described above. Network element 106 may insert the application layer protocol-specific message into message queue 126 by encapsulating the application layer protocol-specific message into one or more data packets and sending the data packets toward a broker mechanism that manages message queue 126.

3.3 Programmable Adapters

According to one embodiment, a user may create a new adapter and cause the new adapter to be stored on and used at one or more of network elements 102, 104, 106, and 108. This "programming" may be done at any time, including after the network elements have already started processing data packets using existing adapters.

In one embodiment, a user "provisions" network elements with a customized adapter by uploading the customized adapter to management console 122. The user may indicate, using management console 122, which ones of the network elements should receive the customized adapter. In response, management console 122 sends the customized adapter to the specified network elements (or, if none are specified, to all of the network elements for which management console 122 is responsible). The network elements receive the customized adapter and locally store the customized adapter in response. The network elements may store mapping information that associates with customized adapter with one or more TCP ports.

Thereafter, when the network elements receive messages that conform to the application layer protocol that corresponds to the customized adapter, the network elements provide those messages to the customized adapter, which is able to convert those messages into canonical messages. Thus, network elements may be programmed to understand and convert application layer messages that conform to proprietary application layer protocols.

3.4 Multi-Blade Architecture

Figure 6:
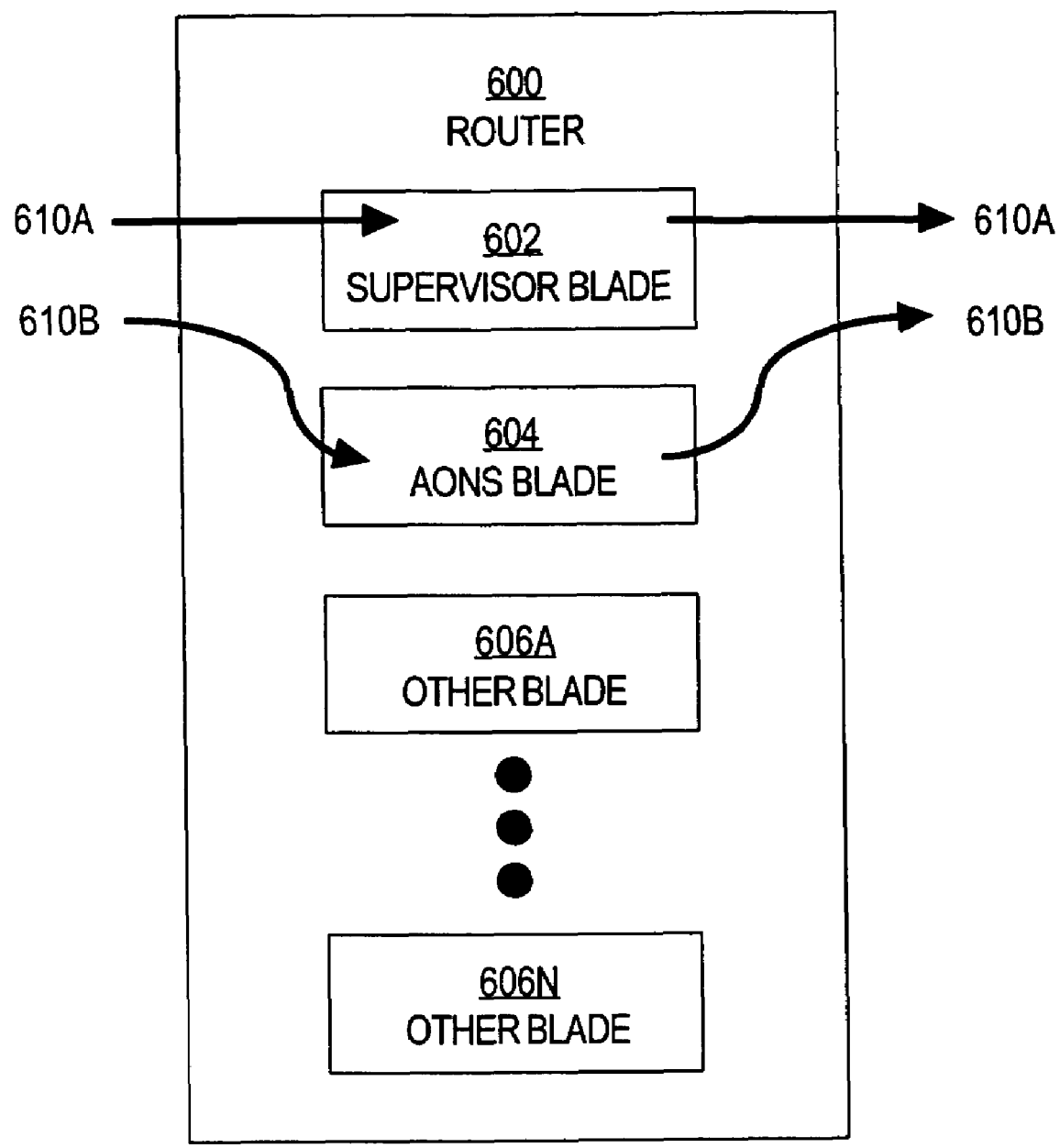
FIG. 6 is a block diagram that illustrates one embodiment of a router in which a supervisor blade directs some packet flows to an AONS blade and/or other blades.

According to one embodiment, an Application-Oriented Network Services (AONS) blade in a router performs one or more of the actions discussed above. FIG. 6 is a block diagram that illustrates one embodiment of a router 600 in which a supervisor blade 602 directs some of packet flows 610A-B to an AONS blade and/or other blades 606N. Router 600 comprises supervisor blade 602, AONS blade 604, and other blades 606A-N. Each of blades 602, 604, and 606A-N is a single circuit board populated with components such as processors, memory, and network connections that are usually found on multiple boards. Blades 602, 604, and 606A-N are designed to be addable to and removable from router 600. The functionality of router 600 is determined by the functionality of the blades therein. Adding blades to router 600 can augment the functionality of router 600, but router 600 can provide a lesser degree of functionality with fewer blades at a lesser cost if desired. One of more of the blades may be optional.

Router 600 receives packet flows such as packet flows 610A-B. More specifically, packet flows 610A-B received by router 600 are received by supervisor blade 602. Supervisor blade 602 may comprise a forwarding engine and/or a route processor such as those commercially available from Cisco Systems, Inc.

In one embodiment, supervisor blade 602 classifies packet flows 610A-B based on one or more parameters contained in the packet headers of those packet flows. If the parameters contained in the packet header of a particular packet match specified parameters, then supervisor blade 602 sends the packets to a specified one of AONS blade 604 and/or other blades 606A-N. Alternatively, if the parameters contained in the packet header do not match any specified parameters, then supervisor blade 602 performs routing functions relative to the particular packet and forwards the particular packet on toward the particular packet's destination.

For example, supervisor blade 602 may determine that packet headers in packet flow 610B match specified parameters. Consequently, supervisor blade 602 may send packets in packet flow 610B to AONS blade 604. Supervisor blade 602 may receive packets back from AONS blade 604 and/or other blades 606A-N and send the packets on to the next hop in a network path that leads to those packets' destination. For another example, supervisor blade 602 may determine that packet headers in packet flow 610A do not match any specified parameters. Consequently, without sending any packets in packet flow 610A to AONS blade 604 or other blades 606A-N, supervisor blade 602 may send packets in packet flow 610A on to the next hop in a network path that leads to those packets' destination.

AONS blade 604 and other blades 606A-N receive packets from supervisor blade 602, perform operations relative to the packets, and return the packets to supervisor blade 602. Supervisor blade 602 may send packets to and receive packets from multiple blades before sending those packets out of router 600. For example, supervisor blade 602 may send a particular group of packets to other blade 606A. Other blade 606A may perform firewall functions relative to the packets and send the packets back to supervisor blade 602. Supervisor blade 602 may receive the packet from other blade 606A and send the packets to AONS blade 604. AONS blade 604 may perform one or more message payload-based operations relative to the packets and send the packets back to supervisor blade 602.

According to one embodiment, the following events occur at an AONS router such as router 600. First, packets, containing messages from clients to servers, are received. Next, access control list-based filtering is performed on the packets and some of the packets are sent to an AONS blade or module. Next, TCP termination is performed on the packets. Next, Secure Sockets Layer (SSL) termination is performed on the packets if necessary. Next, Universal Resource Locator (URL)-based filtering is performed on the packets. Next, message header-based and message content-based filtering is performed on the packets. Next, the messages contained in the packets are classified into AONS message types. Next, a policy flow that corresponds to the AONS message type is selected. Next, the selected policy flow is executed. Then the packets are either forwarded, redirected, dropped, copied, or fanned-out as specified by the selected policy flow.

3.5 Classifying Messages

Figure 3A:
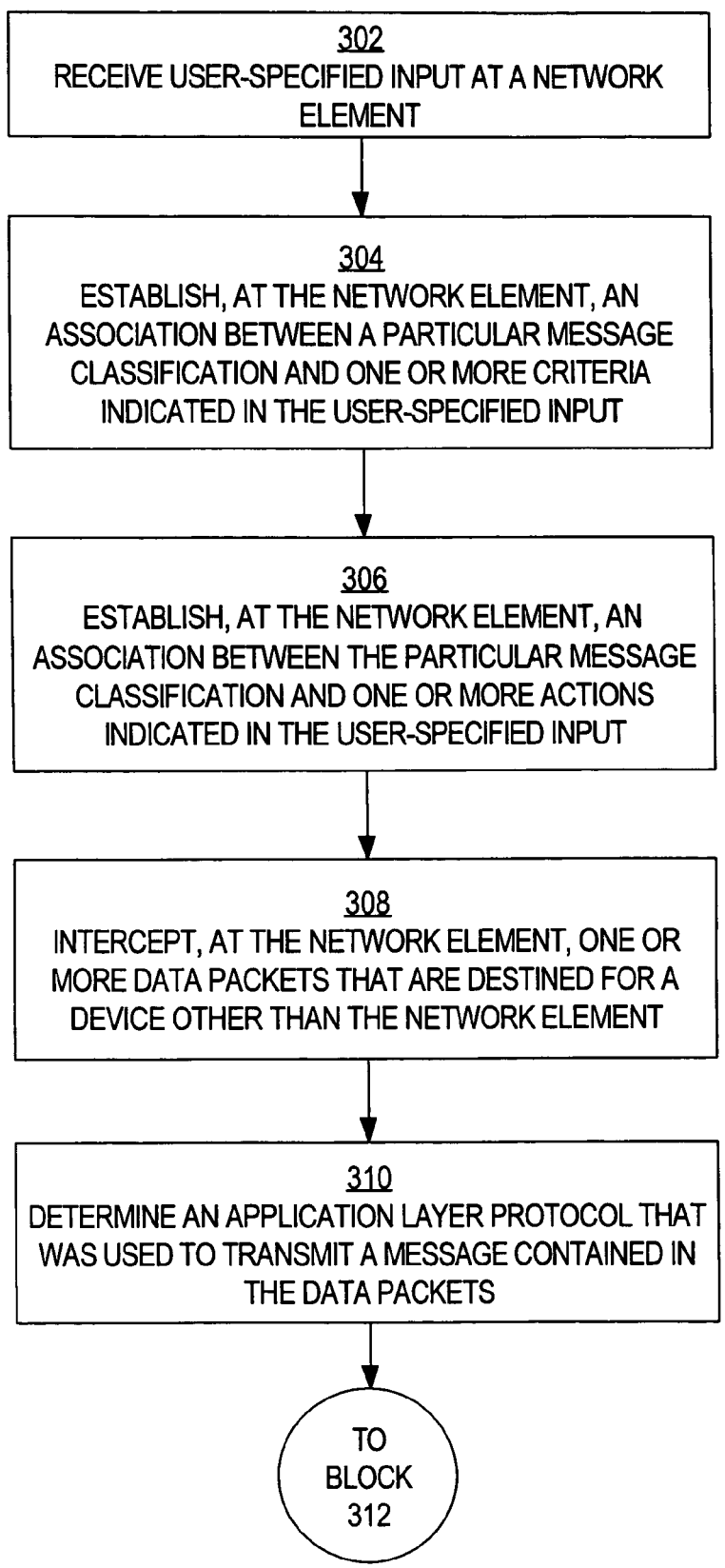
FIGS. 3A-B depict a flow diagram that illustrates one embodiment of a method of classifying messages.
Figure 3B:
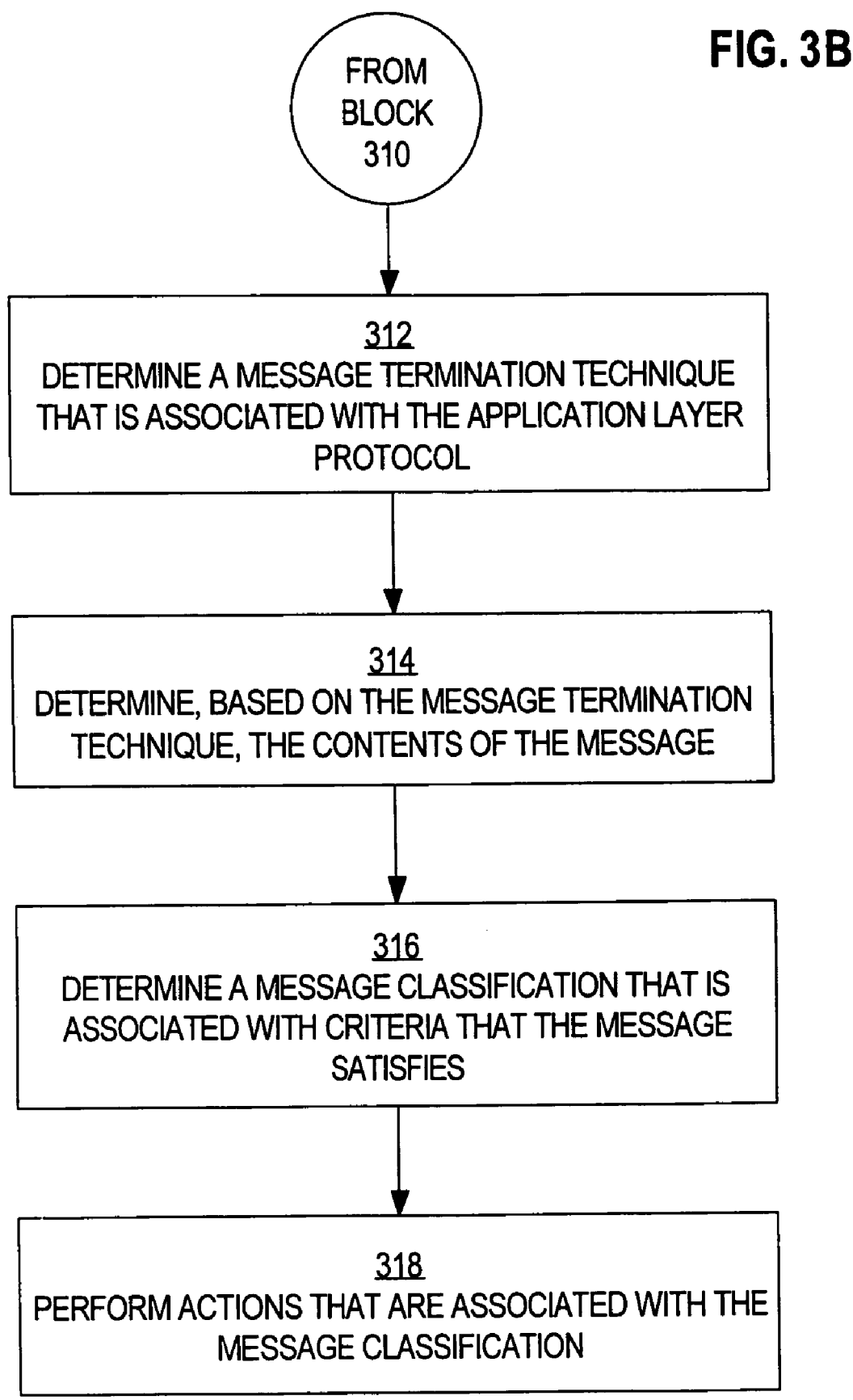

FIGS. 3A-B depict a flow diagram 300 that illustrates one embodiment of a method of classifying messages. For example, one or more of network elements 102, 104, 106, and 108 may perform such a method. More specifically, AONS blade 604 may perform one or more steps of such a method. Other embodiments may omit one or more of the operations depicted in flow diagram 300. Other embodiments may contain operations additional to the operation depicted in flow diagram 300. Other embodiments may perform the operations depicted in flow diagram 300 in an order that differs from the order depicted in flow diagram 300.

Referring first to FIG. 3A, in block 302, user-specified input is received at a network element. The user-specified input indicates the following: one or more criteria that are to be associated with a particular message classification, and one or more actions that are to be associated with the particular message classification. The user-specified input may indicate an order in which the one or more actions are to be performed. The user-specified input may indicate that outputs of actions are to be supplied as inputs to other actions. For example, network element 104, and more specifically AONS blade 604, may receive such user-specified input from a network administrator.

In block 304, an association is established, at the network element, between the particular message classification and the one or more criteria. For example, AONS blade 604 may establish an association between a particular message classification and one or more criteria. For example, the criteria may indicate a particular string of text that a message needs to contain in order for the message to belong to the associated message classification. For another example, the criteria may indicate a particular path that needs to exist in the hierarchical structure of an XML-formatted message in order for the message to belong to the associated message classification. For another example, the criteria may indicate one or more source IP addresses and/or destination IP addresses from or to which a message needs to be addressed in order for the message to belong to the associated message classification.

In block 306, an association is established, at the network element, between the particular message classification and the one or more actions. One or more actions that are associated with a particular message classification comprise a "policy" that is associated with that particular message classification. A policy may comprise a "flow" of one or more actions that are ordered according to a particular order specified in the user-specified input, and/or one or more other actions that are not ordered. For example, AONS blade 604 may establish an association between a particular message classification and one or more actions. Collectively, the operations of blocks 302-306 comprise "provisioning" the network element.

In block 308, one or more data packets that are destined for a device other than the network element are intercepted by the network element. The data packets may be, for example, data packets that contain IP and TCP headers. The IP addresses indicated in the IP headers of the data packets differ from the network element's IP address; thus, the data packets are destined for a device other than the network element. For example, network element 104, and more specifically, supervisor blade 602, may intercept data packets that client application 110 originally sent. The data packets might be destined for server application 112, for example.

In block 310, based on one or more information items indicated in the headers of the data packets, an application layer protocol that was used to transmit a message contained in the payload portions of the data packets (hereinafter "the message") is determined. The information items may include, for example, a source IP address in an IP header, a destination IP address in an IP header, a TCP source port in a TCP header, and a TCP destination port in a TCP header. For example, network element 104, and more specifically AONS blade 604, may store mapping information that maps FTP (an application layer protocol) to a first combination of IP addresses and/or TCP ports, and that maps HTTP (another application layer protocol) to a second combination of IP addresses and/or TCP ports. Based on this mapping information and the IP addresses and/or TCP ports indicated by the intercepted data packets, AONS blade 604 may determine which application layer protocol (FTP, HTTP, Simple Mail Transfer Protocol (SMTP), etc.) was used to transmit the message.

In block 312, a message termination technique that is associated with the application layer protocol used to transmit the message is determined. For example, AONS blade 604 may store mapping information that maps FTP to a first procedure, that maps HTTP to a second procedure, and that maps SMTP to a third procedure. The first procedure may employ a first message termination technique that can be used to extract, from the data packets, a message that was transmitted using FTP. The second procedure may employ a second message termination technique that can be used to extract, from the data packets, a message that was transmitted using HTTP. The third procedure may employ a third message termination technique that can be used to extract, from the data packets, a message that was transmitted using SMTP. Based on this mapping information and the application layer protocol used to transmit the message, AONS blade 604 may determine which procedure should be called to extract the message from the data packets.

In block 314, the contents of the message are determined based on the termination technique that is associated with the application layer protocol that was used to transmit the message. For example, AONS blade 604 may provide the data packets as input to a procedure that is mapped to the application layer protocol determined in block 312. The procedure may use the appropriate message termination technique to extract the contents of the message from the data packets. The procedure may return the message as output to AONS blade 604. Thus, in one embodiment, the message extracted from the data packets is independent of the application layer protocol that was used to transmit the message.

In block 316, a message classification that is associated with criteria that the message satisfies is determined. For example, AONS blade 604 may store mapping information that maps different criteria to different message classifications. The mapping information indicates, among possibly many different associations, the association established in block 304. AONS blade 604 may determine whether the contents of the message satisfy criteria associated with any of the known message classifications. In one embodiment, if the contents of the message satisfy the criteria associated with a particular message classification, then it is determined that the message belongs to the particular message classification.

Although, in one embodiment, the contents of the message are used to determine a message's classification, in alternative embodiments, information beyond that contained in the message may be used to determine the message's classification. For example, in one embodiment, a combination of the contents of the message and one or more IP addresses and/or TCP ports indicated in the data packets that contain the message is used to determine the message's classification. For another example, in one embodiment, one or more IP addresses and/or TCP ports indicated in the data packets that contain the message are used to determine the message's classification, regardless of the contents of the message.

In block 318, one or more actions that are associated with the message classification determined in block 316 are performed. If two or more of the actions are associated with a specified order of performance, as indicated by the user-specified input, then those actions are performed in the specified order. If the output of any of the actions is supposed to be provided as input to any of the actions, as indicated by the user-specified input, then the output of the specified action is provided as input to the other specified action.

A variety of different actions may be performed relative to the message. For example, an action might indicate that the message is to be dropped. In this case, the message is prevented from being forwarded out of the network element toward that message's destination. For another example, an action might indicate that a message is to be compressed using a specified compression technique before being forwarded out of the network element.

For another example, an action might indicate that the content of the message is to be altered in a specified manner. For example, an action might indicate that specified text is to be inserted into a specified location in the message. Such a location might be specified by a path in an XML hierarchical structure of the message, for example, or by a specified string of text occurring in the message. For another example, an action might indicate that specified text is to be deleted from the message. For another example, an action might indicate that specified text is to be substituted for other specified text in the message. Text inserted into the message might be obtained dynamically ("on the fly") from a database that is external to the network element.

For another example, an action might indicate that the message format of a message is to be altered in a specified manner. For example, an action might indicate that a message's format is to be changed from XML to some other format such as EDI. For another example, an action might indicate that a message's format is to be changed from some format other than XML into XML. The message format may be altered without altering the core content of the message, which is independent of the message format.

For another example, an action might indicate that the message is to be forwarded using a specified application layer protocol other than the application layer protocol that the message's origin used to transmit the message. For example, client application 110 might have used a first application layer protocol, such as HTTP, to transmit the message. Thus, when intercepted by network element 104, the message might have contained an HTTP header. However, in accordance with a specified action, before network element 104 forwards the message towards the message's destination, network element 104, and more specifically AONS blade 604, may modify the message so that the message will be carried using an application layer protocol other than HTTP (such as FTP, SMTP, etc.).

For another example, an action might indicate that the message's destination is to be altered so that the message will be forwarded towards a device that is different from the device that the message's source originally specified. For example, in accordance with a specified action, network element 104, and more specifically AONS blade 604, might encapsulate the message in one or more new IP data packets that indicate a new destination IP address that differs from the destination IP address that the originally intercepted IP data packets indicated. Network element 104 may then forward the new IP data packets toward the new destination. In this manner, message content-based routing may be achieved.

For another example, an action might indicate that a specified event is to be written into a specified log that might be external to the network element. For example, in accordance with a specified action, network element 104, and more specifically AONS blade 604, might write at least a portion of the message, along with the IP address from which the message was received, to a log file.

For another example, an action might indicate that the message is to be encrypted using a specified key before being forwarded to a destination. For example, in accordance with a specified action, network element 104, and more specifically AONS blade 604, might encrypt at least a portion of the message using a specified key and then forward data packets that contain the encrypted message towards the message's destination.

For another example, an action might indicate that a response cached at the network element is to be returned to the device from which the message originated, if such a response is cached at the network element. For example, network element 104, and more specifically AONS blade 604, may determine whether a response to the message is cached at network element 104; such a response might have be cached at network element 104 at the time a previous response to the same message passed through network element 104. If network element 104 determines that such a response is cached, then network element 104 may return the response to the message's origin. Consequently, network element 104 does not need to forward the message to the message's destination, and the message's destination does not need to issue another response to the message.

If the message was modified in some way (e.g., content, format, or protocol modification) during the performance of the actions, and if the modified message is supposed to be forwarded out of the network element, then the network element encapsulates the modified message into new data packets and sends the new data packets towards the modified message's destination—which also might have been modified.

A message might not belong to any known message classification. In this case, according to one embodiment, the network element does not perform any user-specified actions relative to the message. Instead, the network element simply forwards the data packets to the next hop along the path to the data packets' indicated destination.

As a result of the method illustrated in flow diagram 300, applications such as client application 110, server application 112, and server application 114 can communicate with each other as though no network elements acted as intermediaries, and as though each other application communicated using the same message format and application layer protocol.

3.6 Action Flows

Figure 4:
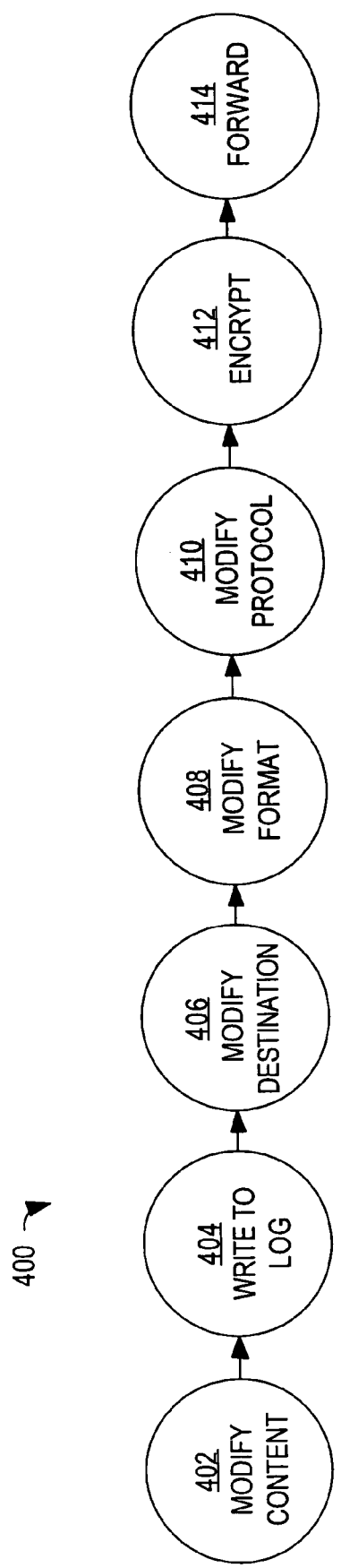
FIG. 4 depicts a sample flow that might be associated with a particular message classification.

FIG. 4 depicts a sample flow 400 that might be associated with a particular message classification. Flow 400 comprises, in order, actions 402-414; other flows may comprise one or more other actions. Action 402 indicates that the content of the message should be modified in a specified manner. Action 404 indicates that a specified event should be written to a specified log. Action 406 indicates that the message's destination should be changed to a specified destination. Action 408 indicates that the message's format should be translated into a specified message format. Action 410 indicates that the application layer protocol used to transmit the message should be changed to a specified application layer protocol. Action 412 indicates that the message should be encrypted using a particular key. Action 414 indicates that the message should be forwarded towards the message's destination.

In other embodiments, any one of actions 402-414 may be performed individually or in combination with any others of actions 402-414.

3.7 AONS Examples 3.7.1 AONS General Overview

Application-Oriented Network Systems (AONS) is a technology foundation for building a class of products that embed intelligence into the network to better meet the needs of application deployment. AONS complements existing networking technologies by providing a greater degree of awareness of what information is flowing within the network and helping customers to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS provides this enhanced support by understanding more about the content and context of information flow. As such, AONS works primarily at the message rather than at the packet level. Typically, AONS processing of information terminates a TCP connection to inspect the full message, including the "payload" as well as all headers. AONS also understands and assists with popular application-level protocols such as HTTP, FTP, SMTP and de facto standard middleware protocols.

AONS differs from middleware products running on general-purpose computing systems in that AONS' behavior is more akin to a network appliance, in its simplicity, total cost of ownership and performance. Furthermore, AONS integrates with network-layer support to provide a more holistic approach to information flow and management, mapping required features at the application layer into low-level networking features implemented by routers, switches, firewalls and other networking systems.

Although some elements of AONS-like functionality are provided in existing product lines from Cisco Systems, Inc., such products typically work off a more limited awareness of information, such as IP/port addresses or HTTP headers, to provide load balancing and failover solutions. AONS provides a framework for broader functional support, a broader class of applications and a greater degree of control and management of application data.

3.7.2 AONS Terminology

An "application" is a software entity that performs a business function either running on servers or desktop systems. The application could be a packaged application, software running on application servers, a legacy application running on a mainframe, or custom or proprietary software developed in house to satisfy a business need or a script that performs some operation. These applications can communicate with other applications in the same department (departmental), across departments within a single enterprise (intra enterprise), across an enterprise and its partners (inter-enterprise or B2B) or an enterprise and its customers (consumers or B2C). AONS provides value added services for any of the above scenarios.

An "application message" is a message that is generated by an application to communicate with another application. The application message could specify the different business level steps that should be performed in handling this message and could be in any of the message formats described in the section below. In the rest of the document, unless otherwise specified explicitly, the term "message" also refers to an application message.

An "AONS node" is the primary AONS component within the AONS system (or network). As described later, the AONS node can take the shape of a client proxy, server proxy or an intermediate device that routes application messages.

Each application message, when received by the first AONS node, gets assigned an AONS message ID and is considered to be an "AONS message" until that message gets delivered to the destination AONS node. The concept of the AONS message exists within the AONS cloud. A single application message may map to more than one AONS message. This may be the case, for example, if the application message requires processing by more than one business function. For example, a "LoanRequest" message that is submitted by a requesting application and that needs to be processed by both a "CreditCheck" application and a "LoanProcessing" application would require processing by more than one business function. In this example, from the perspective of AONS, there are two AONS messages: The "LoanRequest" to the "CreditCheck" AONS message from the requesting application to the CreditCheck application; and the "LoanRequest" to the "LoanProcessing" AONS message from the CreditCheck application to the LoanProcessing Application.

In one embodiment, AONS messages are encapsulated in an AONP (AON Protocol) header and are translated to a "canonical" format. Reliability, logging and security services are provided from an AONS message perspective.

The set of protocols or methods that applications typically use to communicate with each other are called "application access protocols" (or methods) from an AONS perspective. Applications can communicate to the AONS network (typically end point proxies: a client proxy and a server proxy) using any supported application access methods. Some examples of application access protocols include: IBM MQ Series, Java Message Service (JMS), TIBCO, Simple Object Access Protocol (SOAP) over Hypertext Transfer Protocol (HTTP)/HTTPS, and Simple Mail Transfer Protocol (SMTP). Details about various access methods are explained in later sections of this document.

There are a wide variety of "message formats" that are used by applications. These message formats may range from custom or proprietary formats to industry-specific formats to standardized formats. Extensible Markup Language (XML)

is gaining popularity as a universal language or message format for applications to communicate with each other. AONS supports a wide variety of these formats.

In addition, AONS provides translation services from one format to another based on the needs of applications. A typical deployment might involve a first AONS node that receives an application message (the client proxy) translating the message to a "canonical" format, which is carried as an AONS message through the AONS network. The server proxy might translate the message from the "canonical" format to the format understood by the receiving application before delivering the message. For understanding some of the non-industry standard formats, a message dictionary may be used.

A node that performs the gateway functionality between multiple application access methods or protocols is called a "protocol gateway." An example of this would be a node that receives an application message through File Transfer Protocol (FTP) and sends the same message to another application as a HTTP post. In AONS, the client and server proxies are typically expected to perform the protocol gateway functionality.

If an application generates a message in Electronic Data Interchange (EDI) format and if the receiving application expects the message to be in an XML format, then the message format needs to be translated but the content of the message needs to be kept intact through the translation. In AONS, the end point proxies typically perform this "message format translation" functionality.

In some cases, even though the sending and receiving application use the same message format, the content needs to be translated for the receiving application. For example, if a United States-resident application is communicating with a United Kingdom-resident application, then the date format in the messages between the two applications might need to be translated (from mm/dd/yyyy to dd/mm/yyyy) even if the applications use the same data representation (or message format). This translation is called "content translation."

3.7.3 AONS Functional Overview

As defined previously, AONS can be defined as network-based intelligent intermediary systems that efficiently and effectively integrate business and application needs with more flexible and responsive network services. In particular, AONS can be understood through the following characteristics:

AONS operates at a higher layer (layers 5-6) than traditional network element products (layers 2-4). AONS uses message-level inspection as a complement to packet-level inspection—by understanding application messages, AONS adds value to multiple network element products, such as switches, firewalls, content caching systems and load balancers, on the "message exchange route." AONS provides increased flexibility and granularity of network responsiveness in terms of security, reliability, traffic optimization (compression, caching), visibility (business events and network events) and transformation (e.g., from XML to EDI).

AONS is a comprehensive technology platform, not just a point solution. AONS can be implemented through distributed intelligent intermediary systems that sit between applications, middleware, and databases in a distributed intra- and inter-enterprise environment (routing messages, performing transformations, etc.). AONS provides a flexible framework for end user configuration of business flows and policies and partner-driven extensibility of AONS services.

AONS is especially well suited for network-based deployment. AONS is network-based rather than general-purpose server-based. AONS is hybrid software-based and hardware-based (i.e., application-specific integrated circuit (ASIC)/field programmable gate array (FPGA)-based acceleration). AONS uses out-of-band or in-line processing of traffic, as determined by policy. AONS is deployed in standalone products (network appliances) as well as embedded products (service blades for multiple switching, routing, and storage platforms).

3.7.4 AONS System Overview

Figure 7:
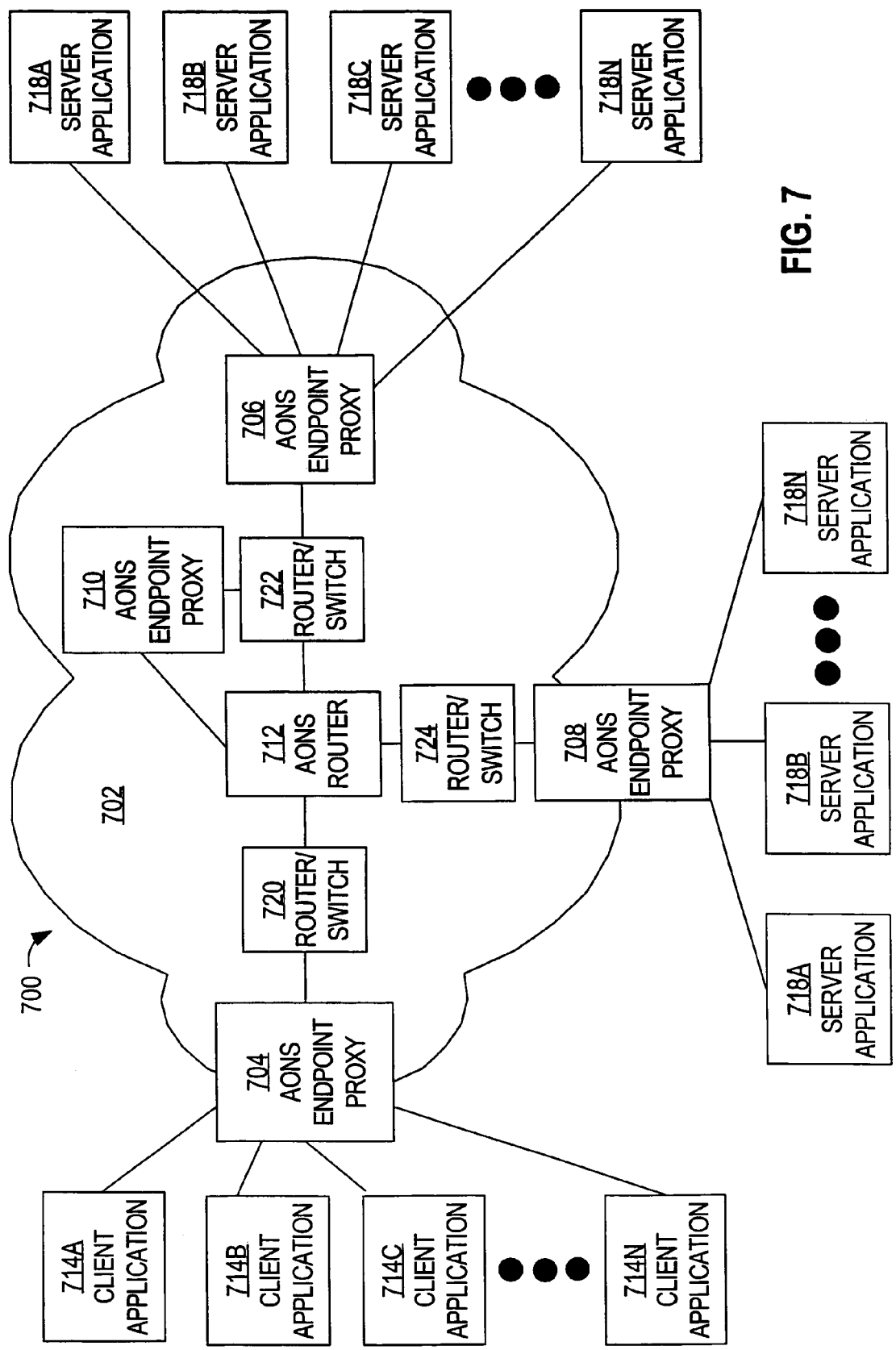
FIG. 7 is a diagram that illustrates the various components involved in an AONS network according to one embodiment.

This section outlines the system overview of an example AONS system. FIG. 7 is a diagram 700 that illustrates the various components involved in an example AONS network 702 according to one embodiment of the invention. The roles performed by each of the nodes are mentioned in detail in subsequent sections.

Within AONS network 702, key building blocks include AONS Endpoint Proxies (AEPs) 704-710 and an AONS Router (AR). Visibility into application intent may begin within AEP 704 placed at the edge of a logical AONS "cloud." As a particular client application of client applications 714A-N attempts to send a message across the network to a particular server application destination of server applications 716A-N and 718A-N, the particular client application will first interact with AEP 704.

AEP 704 serves as either a transparent or explicit messaging gateway which aggregates network packets into application messages and infers the message-level intent by examining the header and payload of a given message, relating the message to the appropriate context, optionally applying appropriate policies (e.g. message encryption, transformation, etc.) and then routing the message towards the message's application destination via a network switch.

AONS Router (AR) 712 may intercept the message en route to the message's destination endpoint. Based upon message header contents, AR 712 may determine that a new route would better serve the needs of a given application system. AR 712 may make this determination based upon enterprise-level policy, taking into account current network conditions. As the message nears its destination, the message may encounter AEP 706, which may perform a final set of operations (e.g. message decryption, acknowledgement of delivery) prior to the message's arrival. In one embodiment, each message is only parsed once: when the message first enters the AONS cloud. It is the first AEP that a message traverses that is responsible for preparing a message for optimal handling within the underlying network.

AEPs 704-708 can further be classified into AEP Client Proxies and AEP Server Proxies to explicitly highlight roles and operations performed by the AEP on behalf of the specific end point applications.

A typical message flow involves a particular client application 714A submitting a message to the AEP Client Proxy (CP) 704 through one of the various access protocols supported by AONS. On receiving this message, AEP CP 704 assigns an AONS message id to the message, encapsulates the message with an AONP header, and performs any necessary operations related to the AONS network (e.g. security and reliability services). Also, if necessary, the message is converted to a "canonical" format by AEP CP 704. The message is carried over a TCP connection to AR 710 along the path to the destination application 718A. The AONS routers along the path perform the infrastructure services necessary for the message and can change the routing based on the policies configured by the customer. The message is received at the destination AEP Server Proxy (SP) 706. AEP SP 706 performs necessary security and reliability functions and translates the message to the format that is understood by the receiving application, if necessary. AEP SP 706 then sends the message to receiving application 718A using any of the access protocols that application 718A and AONS support. A detailed message flow through AONS network 702 is described in later sections.

3.7.5 AONS System Elements

This section outlines the different concepts that are used from an AONS perspective.

An "AEP Client Proxy" is an AONS node that performs the services necessary for applications on the sending side of a message (a client). In the rest of this document, an endpoint proxy also refers to a client or server proxy. The typical responsibilities of the client proxy in processing a message are: message pre-classification & early rejection, protocol management, message identity management, message encapsulation in an AONP header, end point origination for reliable delivery, security end point service origination (encryption, digital signature, authentication), flow selection & execution/infrastructure services (logging, compression, content transformation, etc.), routing—next hop AONS node or destination, AONS node and route discovery/advertising role and routes, and end point origination for the reliable delivery mechanism (guaranteed delivery router).

Not all functionalities described above need to be performed for each message. The functionalities performed on the message are controlled by the policies configured for the AONS node.

An "AEP Server Proxy" is an AONS node that performs the services necessary for applications on the receiving side of a message (a server). In the rest of the document, a Server Proxy may also be referred as an end point proxy. The typical responsibilities of the Server Proxy in processing a message are: protocol management, end point termination for reliable delivery, security end point service termination (decryption, verification of digital signature, etc.), flow selection & execution/infrastructure services (logging, compression, content translation, etc.), message de-encapsulation in AONP header, acknowledgement to sending AONS node, application routing/request message delivery to destination, response message correlation, and routing to entry AONS node.

Note that not all the functionalities listed above need to be performed for each message. The functionalities performed on the message are controlled by the policies configured for the AONS node and what the message header indicates.

An "AONS Router" is an AONS node that provides message-forwarding functionalities along with additional infrastructure services within an AONS network. An AONS Router communicates with Client Proxies, Server Proxies and other AONS Routers. An AONS Router may provide service-without parsing a message; an AONS Router may rely on an AONP message header and the policies configured in the AONS network instead of parsing messages. An AONS Router provides the following functionalities: scalability in the AONS network in terms of the number of TCP connections needed; message routing based on message destination, policies configured in the AONS cloud, a route specified in the message, and/or content of the message; a load at the intended destination—re-routing if needed; availability of the destination—re-routing if needed; cost of transmission (selection among multiple service providers); and infrastructure services such as sending to a logging facility, sending to a storage area network (SAN) for backup purposes, and interfacing to a cache engine for cacheable messages (like catalogs).

AONS Routers do not need to understand any of the application access protocols and, in one embodiment, deal only with messages encapsulated with an AONP header.

Application-Oriented Networking Protocol (AONP) is a protocol used for communication between the nodes in an AONS network. In one embodiment, each AONS message carries an AONP header that conveys the destination of the message and additional information for processing the message in subsequent nodes. AONP also addresses policy exchange (static or dynamic), fail-over among nodes, load balancing among AONS nodes, and exchange of routing information. AONP also enables application-oriented message processing in multiple network elements (like firewalls, cache engines and routers/switches). AONP supports both a fixed header and a variable header (formed using type-length-value (TLV) fields) to-support efficient processing in intermediate nodes as well as flexibility for additional services.

Unless explicitly specified otherwise, "router" or "switch" refers herein to a typical Layer 3 or Layer 2 switch or a router that is currently commercially available.

3.7.6 AONS Example Features

In one embodiment, an underlying "AONS foundation platform of subsystem services" (AOS) provides a range of general-purpose services including support for security, compression, caching, reliability, policy management and other services. On top of this platform, AONS then offers a range of discreet functional components that can be wired together to provide the overall processing of incoming data traffic. These "bladelets™" are targeted at effecting individual services in the context of the specific policy or action demanded by the application or the information technology (IT) manager. A series of access method adaptors ensure support for a range of ingress and egress formats. Finally, a set of user-oriented tools enable managers to appropriately view, configure and set policies for the AONS solution. These four categories of functions combine to provide a range of end-customer capabilities including enhanced security, infrastructure optimization, business continuity, application integration and operational visibility.

The enhanced visibility and enhanced responsiveness enabled by AONS solutions provides a number of intelligent, application-oriented network services. These intelligent services can be summarized in four primary categories:

Enhanced security and reliability: enabling reliable message delivery and providing message-level security in addition to existing network-level security.

Infrastructure optimization: making more efficient use of network resources by taking advantage of caching and compression at the message level as well as by integrating application and network quality-of-service (QoS).

Business and infrastructure activity monitoring and management: by reading information contained in the application layer message, AONS can log, audit, and manage application-level business events, and combine these with network, server, and storage infrastructure events in a common, policy-driven management environment.

Content-based routing and transformation: message-based routing and transformation of protocol, content, data, and message formats (e.g., XML transformation). The individual features belonging to each of these primary categories are described in greater detail below.

3.7.6.1 Enhanced Security and Reliability

Authentication: AONS can verify the identity of the sender of an inbound message based upon various pieces of information contained within a given message (username/password, digital certificate, Security Assertion Markup Language (SAML) assertion, etc.), and, based upon these credentials, determine whether or not the message should be processed further.

Authorization: Once principal credentials are obtained via message inspection, AONS can determine what level of access the originator of the message should have to the services it is attempting to invoke. AONS may also make routing decisions based upon such derived privileges or block or mask certain data elements within a message once it's within an AONS network as appropriate.

Encryption/Decryption: Based upon policy, AONS can perform encryption of message elements (an entire message, the message body or individual elements such as credit card number) to maintain end-to-end confidentiality as a message travels through the AONS network. Conversely, AONS can perform decryption of these elements prior to arrival at a given endpoint.

Digital Signatures: In order to ensure message integrity and allow for non-repudiation of message transactions, AONS can digitally sign entire messages or individual message elements at any given AEP. The decision as to what gets signed will be determined by policy as applied to information derived from the contents and context of each message.

Reliability: AONS can complement existing guaranteed messaging systems by intermediating between unlike proprietary mechanisms. It can also provide reliability for HTTP-based applications (including web services) that currently lack reliable delivery. As an additional feature, AONS can generate confirmations of successful message delivery as well as automatically generate exception responses when delivery cannot be confirmed.

3.7.6.2 Infrastructure Optimization

Compression: AEPs can compress message data prior to sending the message data across the network in order to conserve bandwidth and conversely decompress it prior to endpoint delivery.

Caching: AONS can cache the results of previous message inquires based upon the rules defined for a type of request or based upon indicators set in the response. Caching can be performed for entire messages or for certain elements of a message in order to reduce application response time and conserve network bandwidth utilization. Message element caching enables delta processing for subsequent message requests.

TCP Connection Pooling: By serving as an intermediary between message clients and servers AONS can consolidate the total number of persistent connections required between applications. AONS thereby reduces the client and server-processing load otherwise associated with the ongoing initiation and teardown of connections between a mesh of endpoints.

Batching: An AONS intermediary can batch transactional messages destined for multiple destinations to reduce disk I/O overheads on the sending system. Similarly, transactional messages from multiple sources can be batched to reduce disk I/O overheads on the receiving system.

Hardware Acceleration: By efficiently performing compute-intensive functions such as encryption and Extensible Stylesheet Language Transformation (XSLT) transformations in an AONS network device using specialized hardware, AONS can offload the computing resources of endpoint servers, providing potentially lower-cost processing capability.

Quality of Service: AONS can integrate application-level QoS with network-level QoS features based on either explicit message prioritization (e.g., a message tagged as "high priority") or via policy that determines when a higher quality of network service is required for a message as specific message content is detected.

Policy Enforcement: At the heart of optimizing the overall AONS solution is the ability to ensure business-level polices are expressed, implemented and enforced by the infrastructure. The AONS Policy Manager ensures that once messages are inspected, the appropriate actions (encryption, compression, routing, etc.) are taken against that message as appropriate.

3.7.6.3 Activity Monitoring and Management

Auditing/Logging/Metering: AONS can selectively filter messages and send them to a node or console for aggregation and subsequent analysis. Tools enable viewing and analysis of message traffic. AONS can also generate automatic responses to significant real-time events, both business and infrastructure-related. By intelligently gathering statistics and sending them to be logged, AONS can produce metering data for auditing or billing purposes.

Management: AONS can combine both message-level and network infrastructure level events to gain a deeper understanding of overall system health. The AONS management interface itself is available as a web service for those who wish to access it programmatic ally.

Testing and Validation: AONS' ability to intercept message traffic can be used to validate messages before allowing them to reach destination applications. In addition to protecting from possible application or server failures, this capability can be leveraged to test new web services and other functions by examining actual message flow from clients and servers prior to production deployment. AONS also provides a "debug mode" that can be turned on automatically after a suspected failure or manually after a notification to assist with the overall management of the device.

Workload Balancing and Failover: AONS provides an approach to workload balancing and failover that is both policy- and content-driven. For example, given an AONS node's capability to intermediate between heterogeneous systems, the AONS node can balance between unlike systems that provide access to common information as requested by the contents of a message. AONS can also address the issue of message affinity necessary to ensure failover at the message rather than just the session level as is done by most existing solutions. Balancing can also take into account the response time for getting a message reply, routing to an alternate destination if the preferred target is temporarily slow to respond.

Business Continuity: By providing the ability to replicate inbound messages to a remote destination, AONS enables customers to quickly recover from system outages. AONS can also detect failed message delivery and automatically re-route to alternate endpoints. AONS AEPs and ARs themselves have built-in redundancy and failover at the component level and can be clustered to ensure high availability.

3.7.6.4 Content-Based Routing and Transformation

Content-based Routing: Based upon its ability to inspect and understand the content and context of a message, AONS provides the capability to route messages to an appropriate destination by matching content elements against preestablished policy configurations. This capability allows AONS to provide a common interface (service virtualization) for messages handled by different applications, with AONS examining message type or fields in the content (part number, account type, employee location, customer zip code, etc.) to route the message to the appropriate application. This capability also allows AONS to send a message to multiple destinations (based on either statically defined or dynamic subscriptions to message types or information topics), with optimal fan-out through AONS routers. This capability further allows AONS to redirect all messages previously sent to an application so that it can be processed by a new application. This capability additionally allows AONS to route a message for a pre-processing step that is deemed to be required before receipt of a message (for example, introducing a management pre-approval step for all travel requests).

Thus capability also allows AONS to route a copy of a message that exceeds certain criteria (e.g. value of order) to an auditing system, as well as forwarding the message to the intended destination. This capability further allows AONS to route a message to a particular server for workload or failover reasons. This capability also allows AONS to route a message to a particular server based on previous routing decisions (e.g., routing a query request based on which server handled for the original order). This capability additionally allows AONS to route based on the source of a message. This capability also allows AONS to route a message through a sequence of steps defined by a source or previous intermediary.

Message Protocol Gateway: AONS can act as a gateway between applications using different transport protocols. AONS supports open standard protocols (e.g. HTTP, FTP, SMTP), as well as popular or de facto standard proprietary protocols such as IBM Websphere MQ.

Message Transformations: AONS can transform the contents of a message to make them appropriate for a particular receiving application. This can be done for both XML and non-XML messages, the latter via the assistance of either a message dictionary definition or a well-defined industry standard format.

3.7.7 AONS Functional Modules

Figure 8:
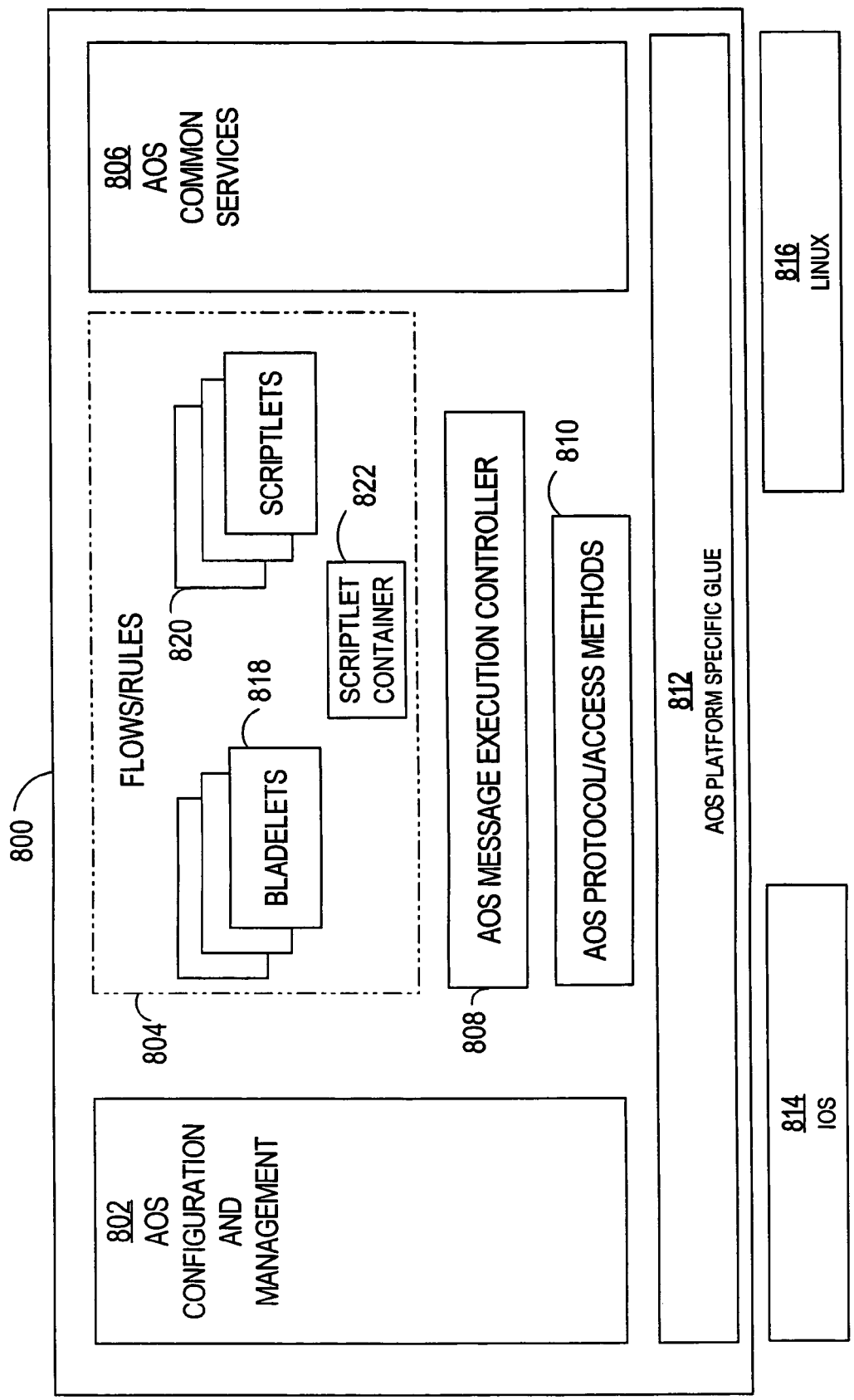
FIG. 8 is a block diagram that depicts functional modules within an example AONS node.

FIG. 8 is a block diagram that depicts functional modules within an example AONS node. AONS node 800 comprises AOS configuration and management module 802, flows/rules 804, AOS common services 806, AOS message execution controller 808, AOS protocol access methods 810, and AOS platform-specific "glue" 812. AONS node 800 interfaces with Internetworking Operating System (IOS) 814 and Linux Operating System 816. Flows/rules 804 comprise bladelets™ 818, scriptlets™ 820, and scriptlet™ container 822.

In one embodiment, AOS common services 806 include: security services, standard compression services, delta compression services, caching service, message logging service, policy management service, reliable messaging service, publish/subscribe service, activity monitoring service, message distribution service, XML parsing service, XSLT transformation service, and QoS management service.

In one embodiment, AOS protocol/access methods 810 include: TCP/SSL, HTTP/HTTPS, SOAP/HTTP, SMTP, FTP, JMS/MQ and JMS/RV, and Java Database Connectivity (JDBC).

In one embodiment, AOS message execution controller 808 includes: an execution controller, a flow subsystem, and a bladelet™ subsystem.

In one embodiment, AOS bladelets™ 818 and scriptlets™ 820 include: message input (read message), message output (send message), logging/audit, decision, external data access, XML parsing, XML transformation, caching, scriptlet container, publish, subscribe, message validation (schema, format, etc.), filtering/masking, signing, authentication, authorization, encryption, decryption, activity monitoring sourcing, activity monitoring marking, activity monitoring processing, activity monitoring notification, message discard, firewall block, firewall unblock, message intercept, and message stop-intercept.

In one embodiment, AOS configuration and management module 802 includes: configuration, monitoring, topology management, capability exchange, failover redundancy, reliability/availability/serviceability (RAS) services (tracing, debugging, etc.), archiving, installation, upgrades, licensing, sample scriptlets™, sample flows, documentation, online help, and language localization.

In one embodiment, supported platforms include: Cisco Catalyst 6503, Cisco Catalyst 6505, Cisco Catalyst 6509, and Cisco Catalyst 6513. In one embodiment, supported supervisor modules include: Sup2 and Sup720. In one embodiment, specific functional areas relating to the platform include: optimized TCP, SSL, public key infrastructure (PKI), encryption/decryption, interface to Cat6K supervisor, failover/redundancy, image management, and QoS functionality.

3.7.8 AONS Modes of Operation

AONS may be configured to run in multiple modes depending on application integration needs, and deployment scenarios. According to one embodiment, the primary modes of operation include implicit mode, explicit mode, and proxy mode. In implicit mode, an AONS node transparently intercepts relevant traffic with no changes to applications. In explicit mode, applications explicitly address traffic to an intermediary AONS node. In proxy mode, applications are configured to work in conjunction with AONS nodes, but applications do not explicitly address traffic to AONS nodes.

In implicit mode, applications are unaware of AONS presence. Messages are address to receiving applications. Messages are redirected to AONS via configuration of application "proxy" or middleware systems to route messages to AONS, and/or via configuration of networks (packet interception). For example, domain name server (DNS)-based redirection could be used to route messages. For another example, a 5-tuple-based access control list (ACL) on a switch or router could be used. Network-based application recognition and content switching modules may be configured for URL/URI redirection. Message-based inspection may be used to determine message types and classifications. In implicit mode, applications communicate with each other using AONS as an intermediary (implicitly), using application-native protocols.

Figure 9:
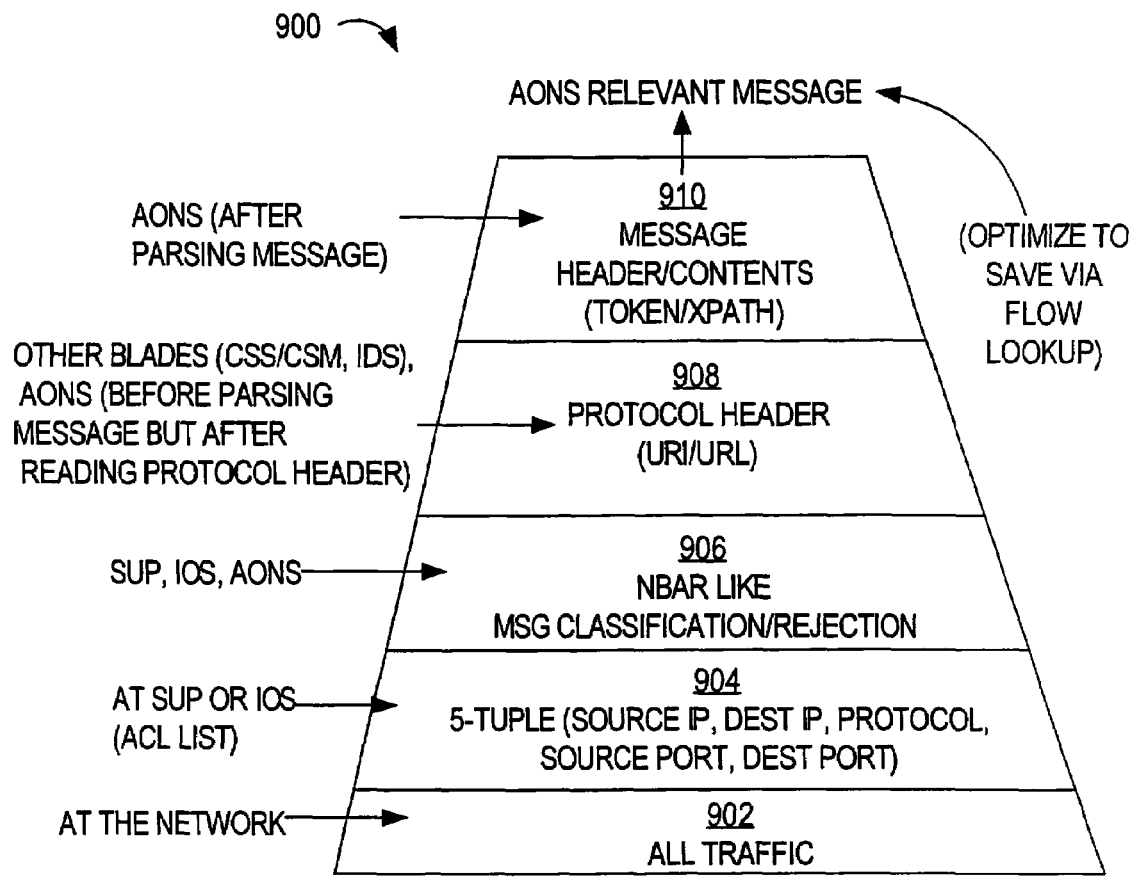
FIG. 9 is a diagram that shows multiple tiers of filtering that may be performed on message traffic in order to produce only a select set of traffic that will be processed at the AONS layer.

Traffic redirection, message classification, and "early rejection" (sending traffic out of AONS layers prior to complete processing within AONS layers) may be accomplished via a variety of mechanisms, such as those depicted in FIG. 9. FIG. 9 shows multiple tiers of filtering that may be performed on message traffic in order to produce only a select set of traffic that will be processed at the AONS layer. Traffic that is not processed at the AONS layer may be treated as any other traffic.

At the lowest layer, layer 902, all traffic passes through. At the next highest layer, layer 904, traffic may be filtered based on 5-tuples. A supervisor blade or Internetwork Operating System (IOS) may perform such filtering. Traffic that passes the filters at layer 904 passes to layer 906. At layer 906, traffic may be further filtered based on network-based application recognition-like filtering and/or message classification and rejection. Traffic that passes the filters at layer 906 passes to layer 908. At layer 908, traffic may be further filtered based on protocol headers. For example, traffic may be filtered based on URLs/URIs in the traffic. Traffic that passes the filters at layer 908 passes to layer 910. At layer 910, traffic may be processed based on application layer messages, include headers and contents. For example, XPath paths within messages may be used to process traffic at layer 910. An AONS blade may perform processing at layer 910. Thus, a select subset of all network traffic may be provided to an AONS blade.

In explicit mode, applications are aware of AONS presence. Messages are explicitly addressed to AONS nodes. Applications may communicate with AONS using AONP. AONS may perform service virtualization and destination selection.

In proxy mode, applications are explicitly unaware of AONS presence. Messages are addressed to their ultimate destinations (i.e., applications). However, client applications are configured to direct traffic via a proxy mode.

3.7.9 AONS Message Routing

Components of message management in AONS may be viewed from two perspectives: a node view and a cloud view.

Figure 10:
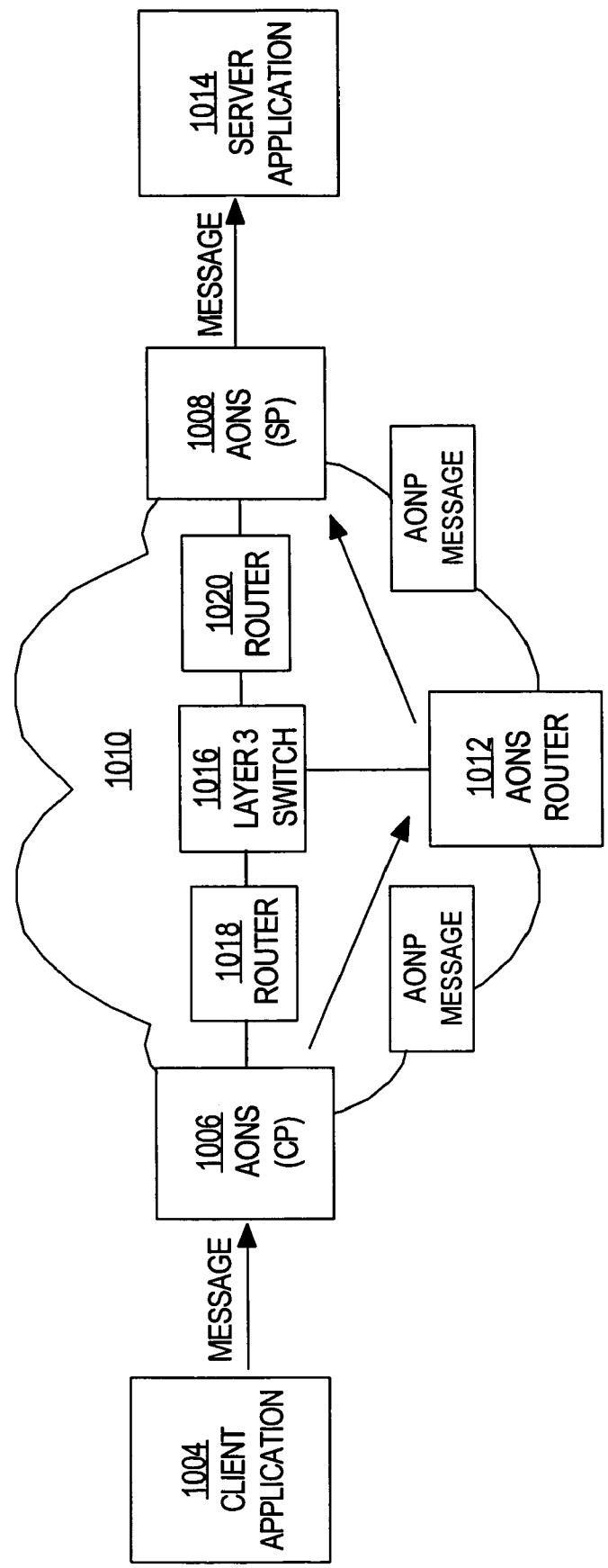
FIG. 10 is a diagram that illustrates the path of a message within an AONS cloud according to a cloud view.

FIG. 10 is a diagram that illustrates the path of a message within an AONS cloud 1010 according to a cloud view. A client application 1004 sends a message to an AONS Client Proxy (CP) 1006. If AONS CP 1006 is not present, then client application 1004 may send the message to an AONS Server Proxy (SP) 1008. The message is processed at AONS CP 1006. AONS CP 1006 transforms the message into AONP format if the message is entering AONS cloud 1010.

Within AONS cloud 1010, the message is routed using AONP. Thus, using AONP, the message may be routed from AONS CP 1006 to an AONS router 1012, or from AONS CP 1006 to AONS SP 1008, or from AONS router 1012 to another AONS router, or from AONS router 1012 to AONS SP 1008. Messages processed at AONS nodes are processed in AONP format.

When the message reaches AONS SP 1008; AONS SP 1008 transforms the message into the message format used by server application 1014. AONS SP 1008 routes the message to server application 1014 using the message protocol of server application 1014. Alternatively, if AONS SP 1008 is not present, AONS CP 1006 may route the message to server application 1014.

The details of the message processing within AONS cloud 1010 can be understood via the following perspectives: Request/Response Message Flow, One-Way Message Flow, Message Flow with Reliable Delivery, and Node-to-Node Communication.

Figure 11A:
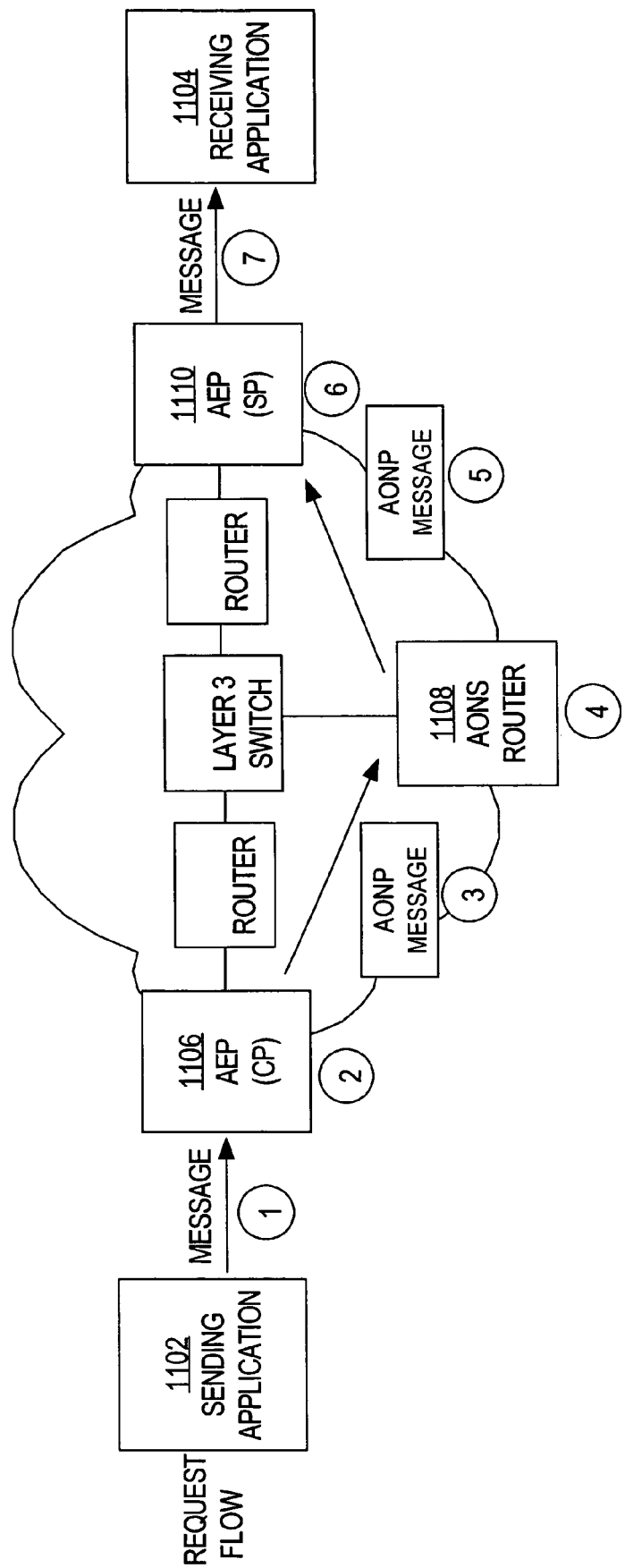
FIG. 11A and FIG. 11B are diagrams that illustrate a request/response message flow.
Figure 11B:
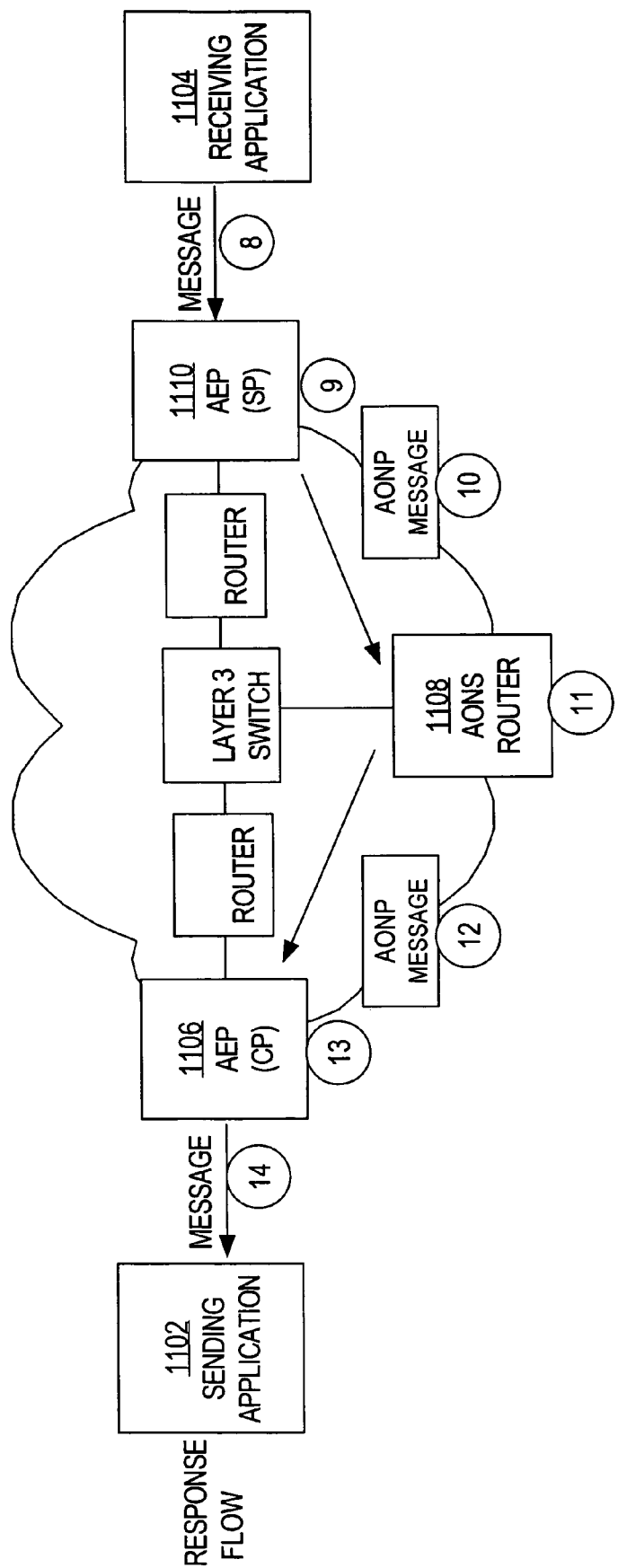

FIG. 11A and FIG. 11B are diagrams that illustrate a request/response message flow. Referring to FIG. 11A, at circumscribed numeral 1, a sending application 1102 sends a message towards a receiving application 1104. At circumscribed numeral 2, an AEP CP 1106 intercepts the message and adds an AONP header to the message, forming an AONP message. At circumscribed numeral 3, AEP CP 1106 sends the AONP message to an AONS router 1108. At circumscribed numeral 4, AONS router 1108 receives the AONP message. At circumscribed numeral 5, AONS router 1108 sends the AONP message to an AEP SP 1110. At circumscribed numeral 6, AEP SP 1110 receives the AONP message and removes the AONP header from the message, thus decapsulating the message. At circumscribed numeral 7, AEP SP 1110 sends the message to receiving application 1104.

Referring to FIG. 11B, at circumscribed numeral 8, receiving application 1104 sends a response message toward sending application 1102. At circumscribed numeral 9, AEP SP 1110 intercepts the message and adds an AONP header to the message, forming an AONP message. At circumscribed numeral 10, AEP SP 1110 sends the AONP message to AONS router 1108. At circumscribed numeral 11, AONS router 1108 receives the AONP message. At circumscribed numeral 12, AONS router 1108 sends the AONP message to AEP CP 1106. At circumscribed numeral 13, AEP CP 1106 receives the AONP message and removes the AONP header from the message, thus decapsulating the message. At circumscribed numeral 14, AEP CP 1106 sends the message to sending application 1102. Thus, a request is routed from sending application 1102 to receiving application 1104, and a response is routed from receiving application 1104 to sending application 1102.

Figure 12A:
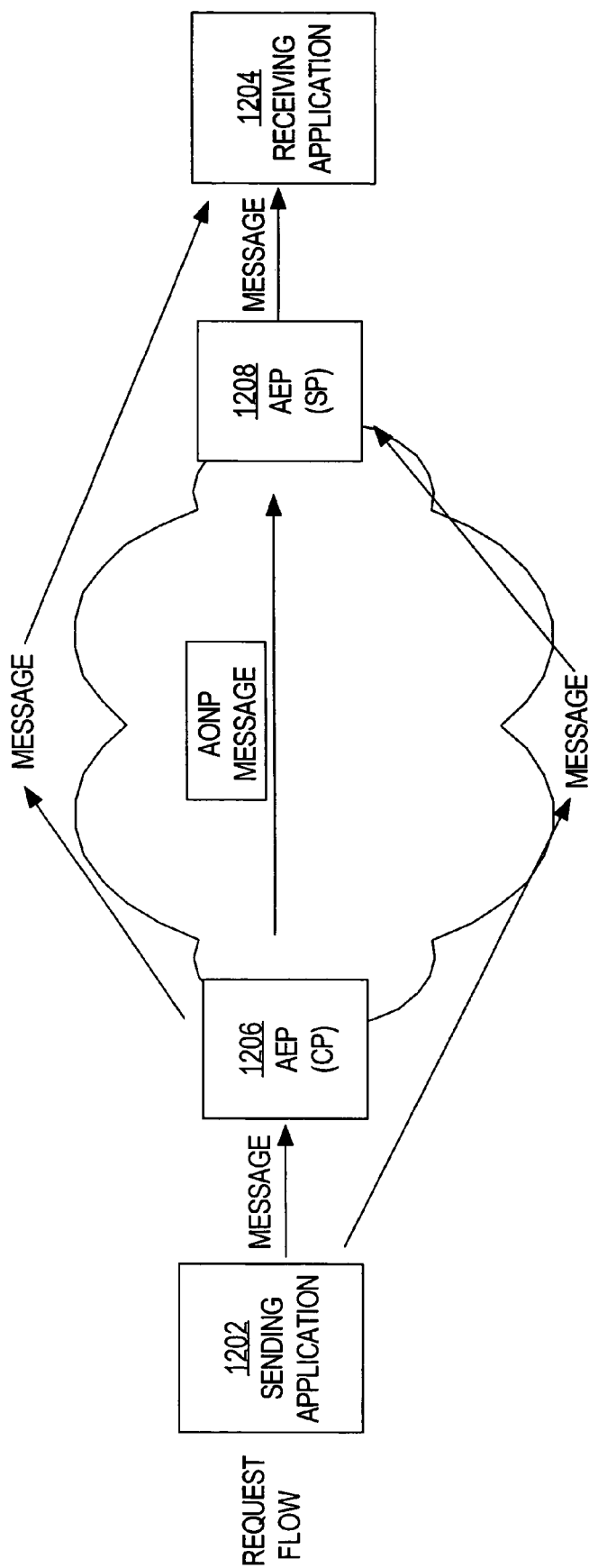
FIG. 12A and FIG. 12B are diagrams that illustrate alternative request/response message flows.
Figure 12B:
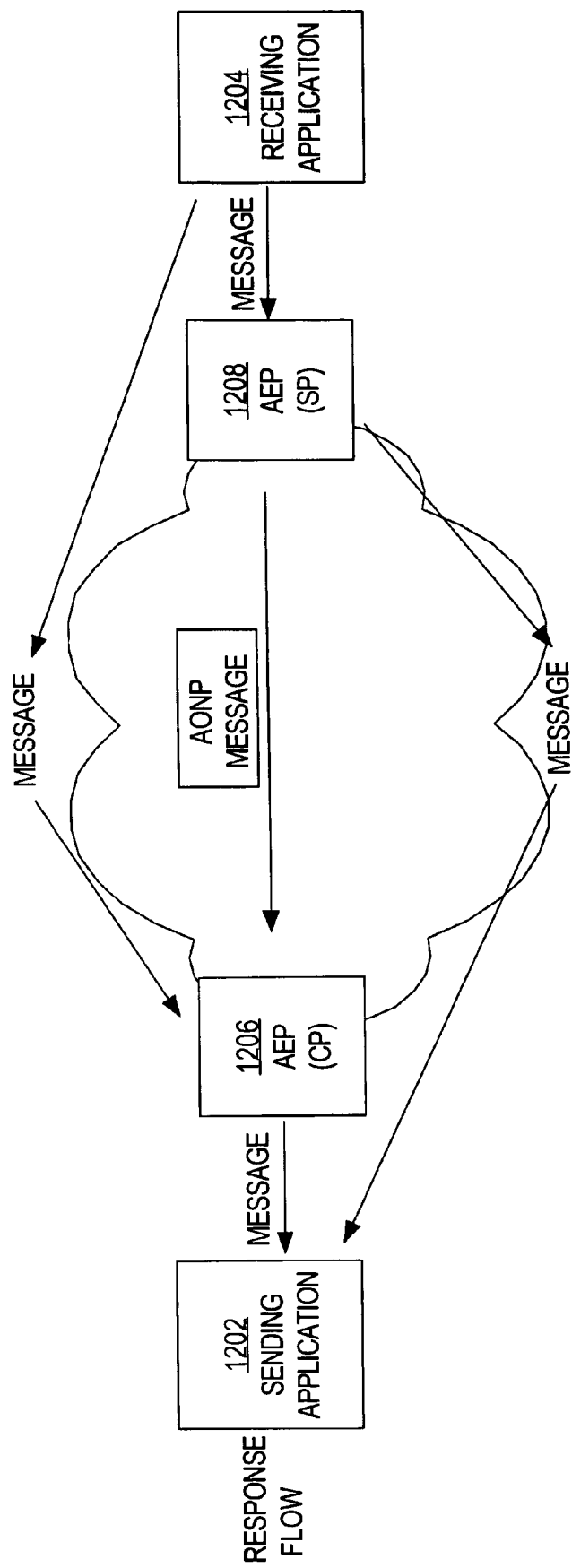

FIG. 12A and FIG. 12B are diagrams that illustrate alternative request/response message flows. FIG. 12A shows three possible routes that a message might take from a sending application 1202 to a receiving application 1204. According to a first route, sending application 1202 sends the message toward receiving application 1204, but an AEP CP 1206 intercepts the message and sends the message to receiving application 1204. According to a second route, sending application 1202 sends the message toward receiving application 1204, but AEP CP 1206 intercepts the message, encapsulates the message within an AONP message, and sends the AONP message to an AEP SP 1208, which decapsulates the message from the AONP message and sends the message to receiving application 1204. According to a third route, sending application 1202 sends the message toward receiving application 1204, but AEP SP 1208 intercepts the message and sends the message to receiving application 1204.

FIG. 12B shows three possible routes that a response message might take from receiving application 1204 to sending application 1202. According to a first route, receiving application 1204 sends the message toward sending application 1202, but AEP CP 1206 intercepts the message and sends the message to sending application 1204. According to a second route, receiving application 1204 sends the message toward sending application 1202, but AEP SP 1208 intercepts the message, encapsulates the message within an AONP message, and sends the AONP message to AEP CP 1206, which decapsulates the message from the AONP message and sends the message to sending application 1202. According to a third route, receiving application 1204 sends the message toward sending application 1202, but AEP SP 1208 intercepts the message and sends the message to sending application 1202.

Figure 13:
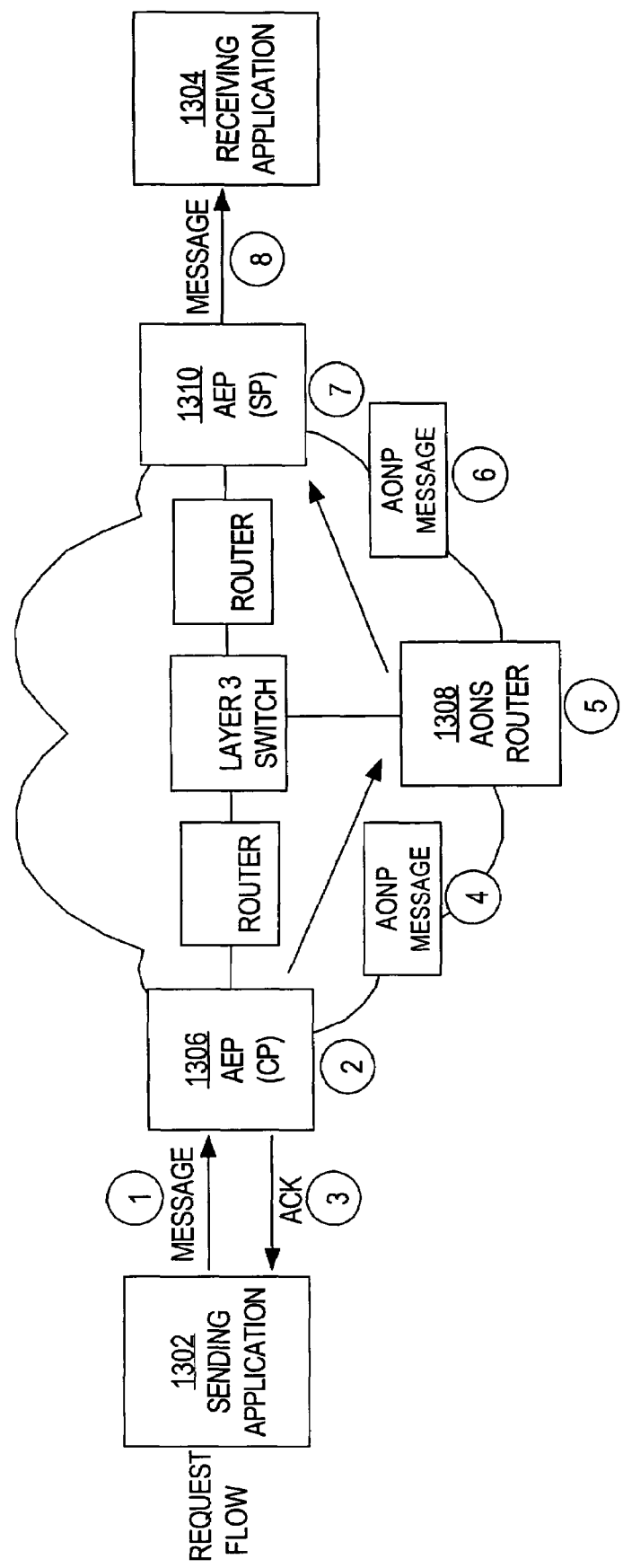
FIG. 13 is a diagram that illustrates a one-way message flow.

FIG. 13 is a diagram that illustrates a one-way message flow. At circumscribed numeral 1, a sending application 1302 sends a message towards a receiving application 1304. At circumscribed numeral 2, an AEP CP 1306 intercepts the message and adds an AONP header to the message, forming an AONP message. At circumscribed numeral 3, AEP CP 1306 sends an ACK (acknowledgement) back to sending application 1302. At circumscribed numeral 4, AEP CP 1306 sends the AONP message to an AONS router 1308. At circumscribed numeral 5, AONS router 1308 receives the AONP message. At circumscribed numeral 6, AONS router 1308 sends the AONP message to an AEP SP 1310. At circumscribed numeral 7, AEP SP 1310 receives the AONP message and removes the AONP header from the message, thus decapsulating the message. At circumscribed numeral 8, AEP SP 1310 sends the message to receiving application 1304.

Figure 14:
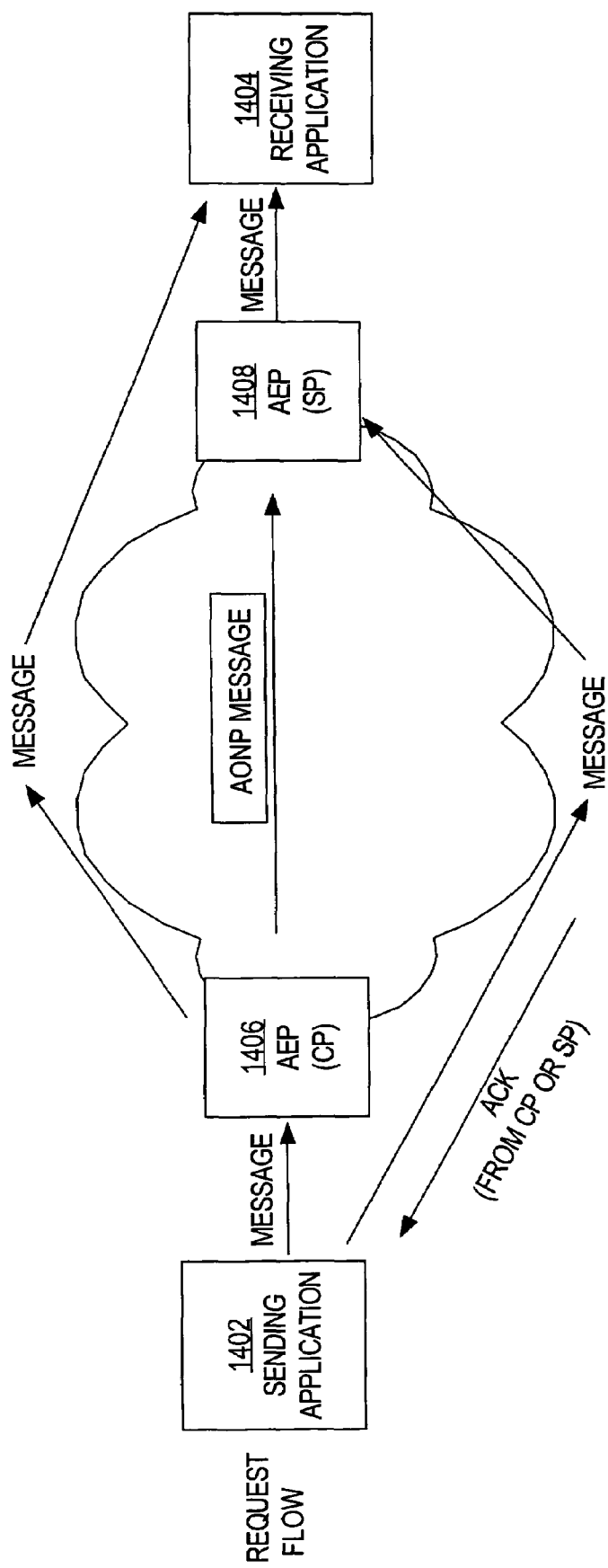
FIG. 14 is a diagram that illustrates alternative one-way message flows.

FIG. 14 is a diagram that illustrates alternative one-way message flows. FIG. 14 shows three possible routes that a message might take from a sending application 1402 to a receiving application 1404. According to a first route, sending application 1402 sends the message toward receiving application 1404, but an AEP CP 1406 intercepts the message and sends the message to receiving application 1404. AEP CP 1406 sends an ACK (acknowledgement) to sending application 1402. According to a second route, sending application 1402 sends the message toward receiving application 1404, but AEP CP 1406 intercepts the message, encapsulates the message within an AONP message, and sends the AONP message to an AEP SP 1408, which decapsulates the message from the AONP message and sends the message to receiving application 1404. Again, AEP CP 1406 sends an ACK to sending application 1402. According to a third route, sending application 1402 sends the message toward receiving application 1404, but AEP SP 1408 intercepts the message and sends the message to receiving application 1404. In this case, AEP SP 1408 sends an ACK to sending application 1402. Thus, when an AEP intercepts a message, the intercepting AEP sends an ACK to the sending application.

According to one embodiment, AONP is used in node-to-node communication with the next hop. In one embodiment, AONP uses HTTP. AONP headers may include HTTP or TCP headers. AONP may indicate RM ACK, QoS level, message priority, and message context (connection, message sequence numbers, message context identifier, entry node information, etc.). The actual message payload is in the message body. Asynchronous messaging may be used between AONS nodes. AONS may conduct route and node discovery via static configuration (next hop) and/or via dynamic discovery and route advertising ("lazy" discovery).

Figure 15A:
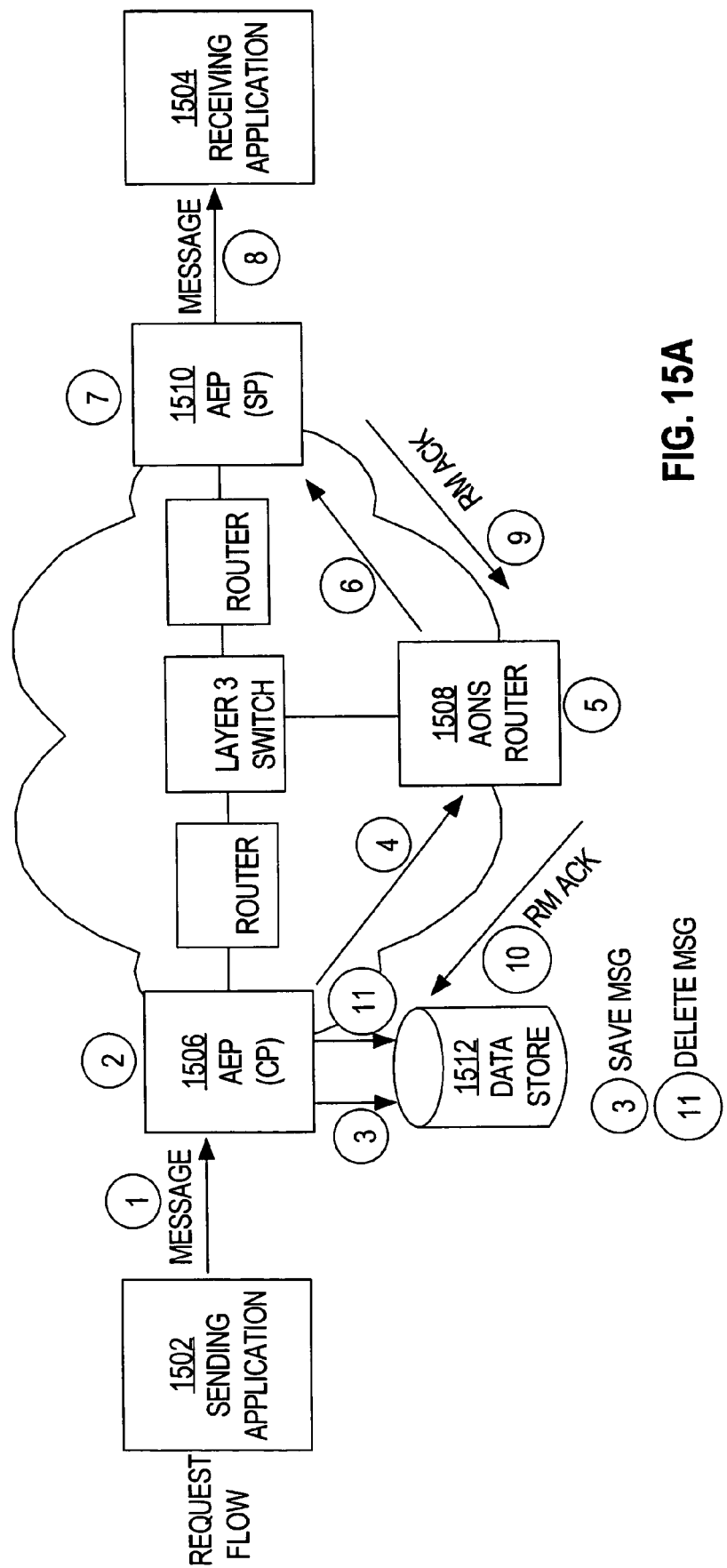
FIG. 15A and FIG. 15B are diagrams that illustrate a request/response message flow with reliable message delivery.
Figure 15B:
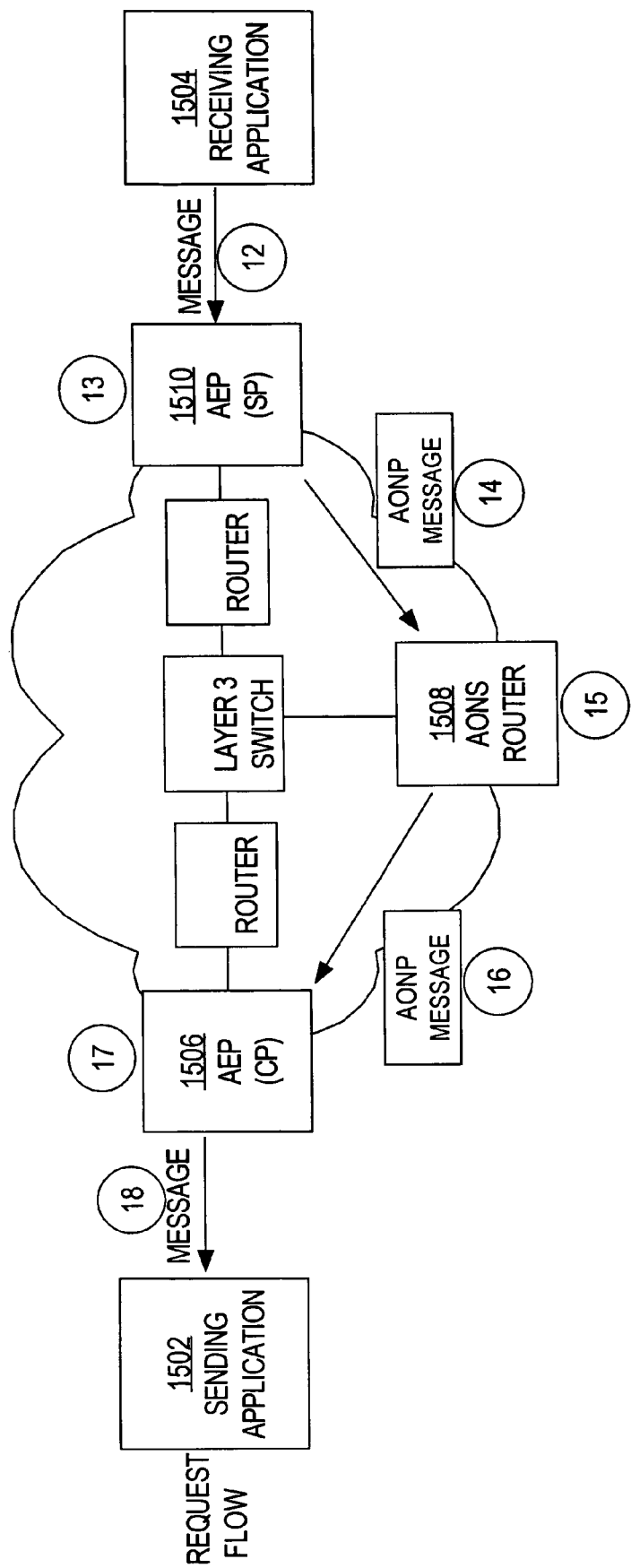

FIG. 15A and FIG. 15B are diagrams that illustrate a request/response message flow with reliable message delivery. Referring to FIG. 15A, at circumscribed numeral 1, a sending application 1502 sends a message towards a receiving application 1504. At circumscribed numeral 2, an AEP CP 1506 intercepts the message and adds an AONP header to the message, forming an AONP message. At circumscribed numeral 3, AEP CP 1506 saves the message to a data store 1512. Thus, if there are any problems with sending the message, AEP CP 1506 can resend the copy of the message that is stored in data store 1512.

At circumscribed numeral 4, AEP CP 1506 sends the AONP message to an AONS router 1508. At circumscribed numeral 5, AONS router 1508 receives the AONP message. At circumscribed numeral 6, AONS router 1508 sends the AONP message to an AEP SP 1510. At circumscribed numeral 7, AEP SP 1510 receives the AONP message and removes the AONP header from the message, thus decapsulating the message. At circumscribed numeral 8, AEP SP 1510 sends the message to receiving application 1504.

At circumscribed numeral 9, AEP SP 1510 sends a reliable messaging (RM) acknowledgement (ACK) to AONS router 1508. At circumscribed numeral 10, AONS router 1508 receives the RM ACK and sends the RM ACK to AEP CP 1506. At circumscribed numeral 11, AEP CP 1506 receives the RM ACK and, in response, deletes the copy of the message that is stored in data store 1512. Because the delivery of the message has been acknowledged, there is no further need to store a copy of the message in data store 1512. Alternatively, if AEP CP 1506 does not receive the RM ACK within a specified period of time, then AEP CP 1506 resends the message.

Referring to FIG. 15B, at circumscribed numeral 12, receiving application 1504 sends a response message toward sending application 1502. At circumscribed numeral 13, AEP SP 1510 intercepts the message and adds an AONP header to the message, forming an AONP message. At circumscribed numeral 14, AEP SP 1510 sends the AONP message to AONS router 1508. At circumscribed numeral 15, AONS router 1508 receives the AONP message. At circumscribed numeral 16, AONS router 1508 sends the AONP message to AEP CP 1506. At circumscribed numeral 17, AEP CP 1506 receives the AONP message and removes the AONP header from the message, thus decapsulating the message. At circumscribed numeral 18, AEP CP 1506 sends the message to sending application 1502.

Figure 16:
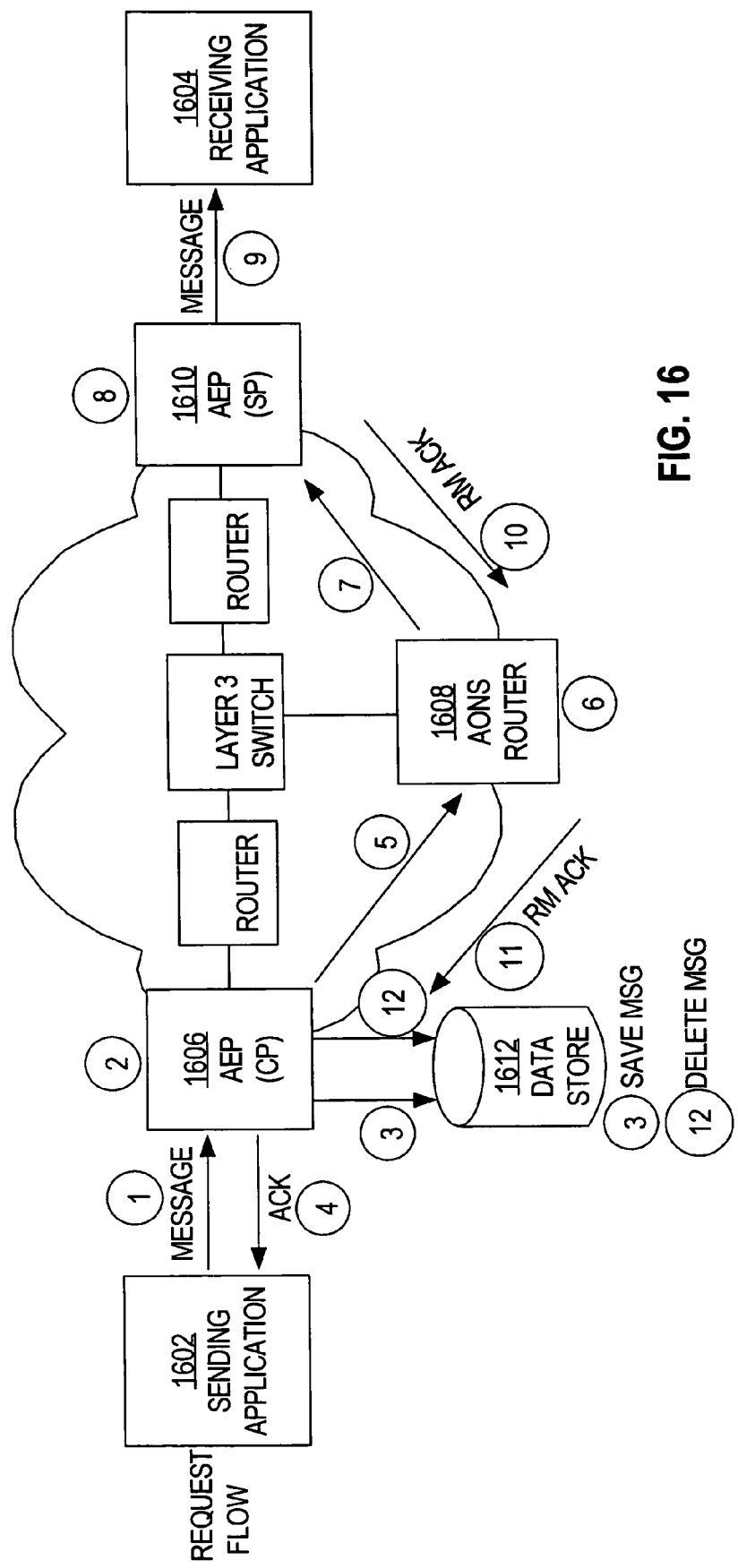
FIG. 16 is a diagram that illustrates a one-way message flow with reliable message delivery.

FIG. 16 is a diagram that illustrates a one-way message flow with reliable message delivery. At circumscribed numeral 1, a sending application 1602 sends a message towards a receiving application 1604. At circumscribed numeral 2, an AEP CP 1606 intercepts the message and adds an AONP header to the message, forming an AONP message. At circumscribed numeral 3, AEP CP 1606 saves the message to a data store 1612. Thus, if there are any problems with sending the message, AEP CP 1606 can resend the copy of the message that is stored in data store 1612. At circumscribed numeral 4, AEP CP 1606 sends an ACK (acknowledgement) back to sending application 1602. At circumscribed numeral 5, AEP CP 1606 sends the AONP message to an AONS router 1608. At circumscribed numeral 6, AONS router 1608 receives the AONP message. At circumscribed numeral 7, AONS router 1608 sends the AONP message to an AEP SP 1610. At circumscribed numeral 8, AEP SP 1610 receives the AONP message and removes the AONP header from the message, thus decapsulating the message. At circumscribed numeral 9, AEP SP 1610 sends the message to receiving application 1604.

At circumscribed numeral 10, AEP SP 1610 sends a reliable messaging (RM) acknowledgement (ACK) to AONS router 1608. At circumscribed numeral 11, AONS router 1608 receives the RM ACK and sends the RM ACK to AEP CP 1606. At circumscribed numeral 12, AEP CP 1606 receives the RM ACK and, in response, deletes the copy of the message that is stored in data store 1612. Because the delivery of the message has been acknowledged, there is no further need to store a copy of the message in data store 1612. Alternatively, if AEP CP 1606 does not receive the RM ACK within a specified period of time, then AEP CP 1606 resends the message.

Figure 17:
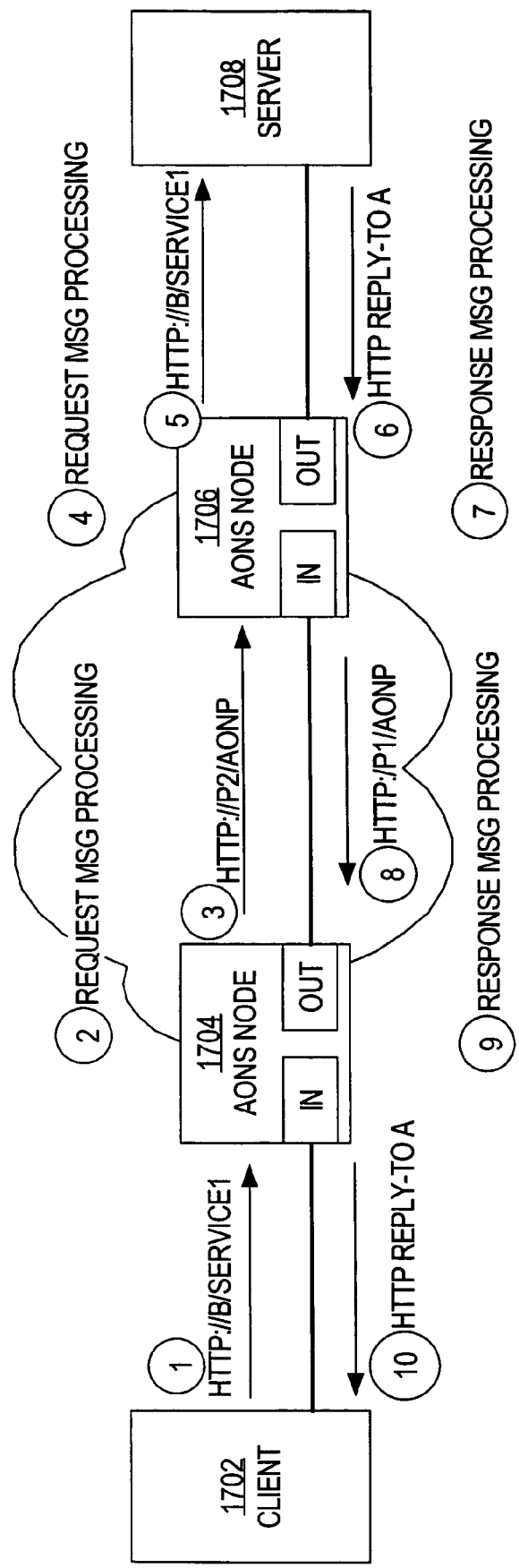
FIG. 17 is a diagram that illustrates synchronous request and response messages.

FIG. 17 is a diagram that illustrates synchronous request and response messages. At circumscribed numeral 1, an AONS node 1704 receives, from a client 1702, a request message, in either implicit or explicit mode. At circumscribed numeral 2, AONS node 1704 reads the message, selects and executes a flow, and adds an AONP header to the message. At circumscribed numeral 3, AONS node 1704 sends the message to a next hop node, AONS node 1706. At circumscribed numeral 4, AONS node 1706 reads the message, selects and executes a flow, and removes the AONP header from the message, formatting the message according to the message format expected by a server 1708. At circumscribed numeral 5, AONS node 1706 sends the message to the message's destination, server 1708.

At circumscribed numeral 6, AONS node 1706 receives a response message from server 1708 on the same connection on which AONS node 1706 sent the request message. At circumscribed numeral 7, AONS node 1706 reads the message, correlates the message with the request message, executes a flow, and adds an AONP header to the message. At circumscribed numeral 8, AONS node 1706 sends the message to AONS node 1704. At circumscribed numeral 9, AONS node 1704 reads the message, correlates the message with the request message, executes a flow, and removes the AONP header from the message, formatting the message according to the message format expected by client 1702. At circumscribed numeral 10, AONS node 1704 sends the message to client 1702 on the same connection on which client 1702 sent the request message to AONS node 1704.

Figure 18:
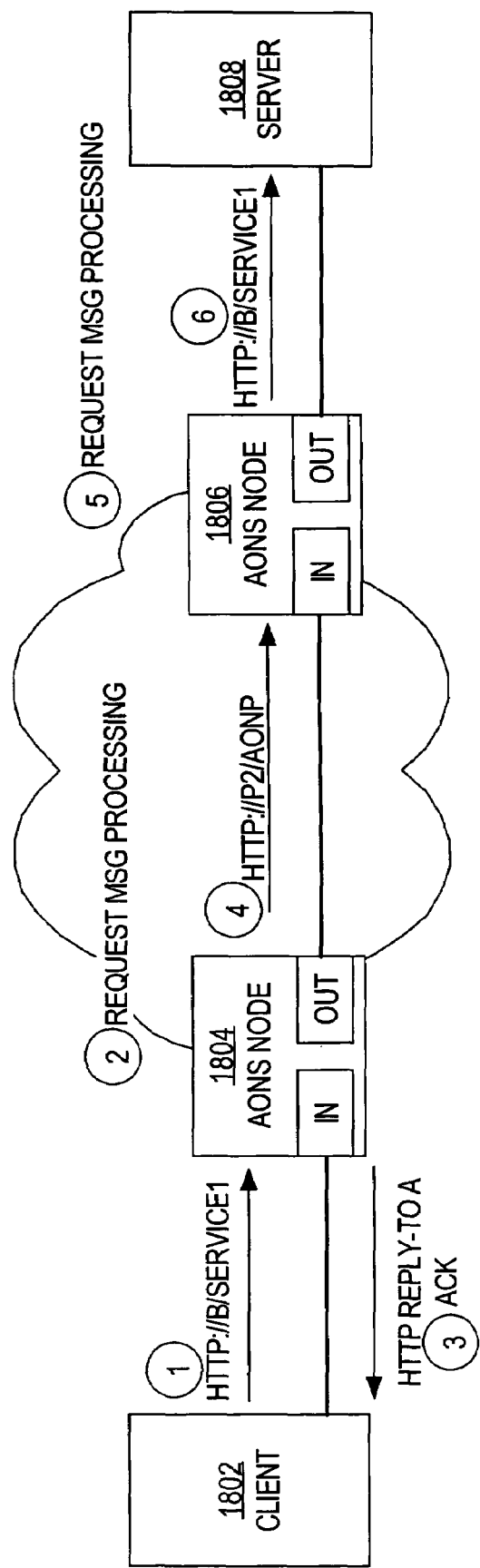
FIG. 18 is a diagram that illustrates a sample one-way end-to-end message flow.

FIG. 18 is a diagram that illustrates a sample one-way end-to-end message flow. At circumscribed numeral 1, an AONS node 1804 receives, from a client 1802, a request message, in either implicit or explicit mode. At circumscribed numeral 2, AONS node 1804 reads the message, selects and executes a flow, and adds an AONP header to the message. At circumscribed numeral 3, AONS node 1804 sends an acknowledgement to client 1802. At circumscribed numeral 4, AONS node 1804 sends the message to a next hop node, AONS node 1806. At circumscribed numeral 5, AONS node 1806 reads the message, selects and executes a flow, and removes the AONP header from the message, formatting the message according to the message format expected by a server 1808. At circumscribed numeral 6, AONS node 1806 sends the message to the message's destination, server 1808.

According to the node view, the message lifecycle within an AONS node, involves ingress/egress processing, message processing, message execution control, and flow execution.

Figure 19:
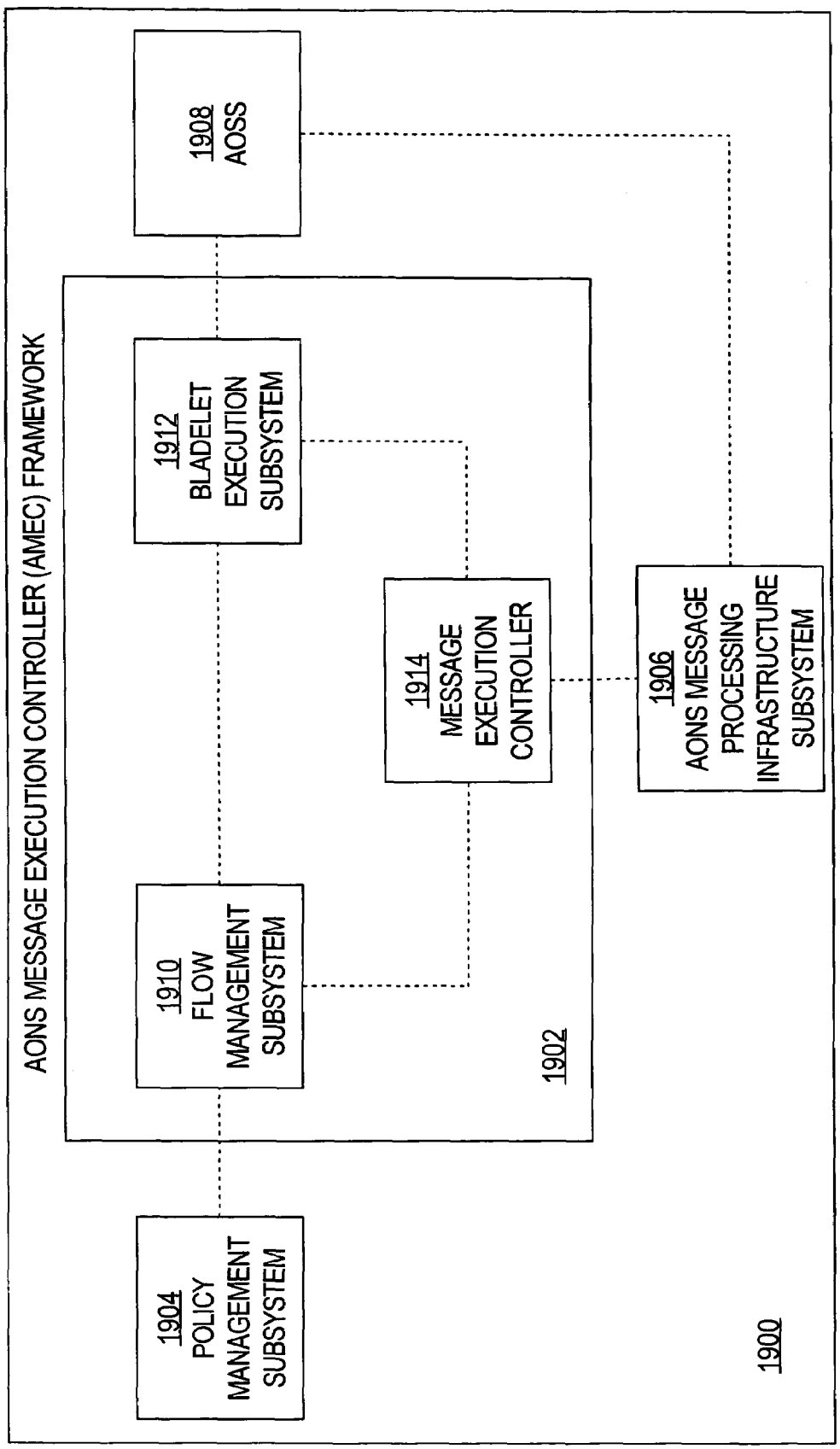
FIG. 19 is a diagram that illustrates message-processing modules within an AONS node.

FIG. 19 is a diagram that illustrates message-processing modules within an AONS node 1900. AONS node 1900 comprises an AONS message execution controller (AMEC) framework 1902, a policy management subsystem 1904, an AONS message processing infrastructure subsystem 1906, and an AOSS 1908. AMEC framework 1902 comprises a flow management subsystem 1910, a bladelet™ execution subsystem 1912, and a message execution controller 1914. Policy management subsystem 1904 communicates with flow management subsystem 1910. AOSS 1908 communicates with bladelet™ execution subsystem 1912 and AONS message processing infrastructure subsystem 1906. AONS message processing infrastructure subsystem 1906 communicates with message execution controller 1914. Flow management subsystem 1910, bladelet™ execution subsystem, and message execution controller 1914 all communicate with each other.

Figure 20:
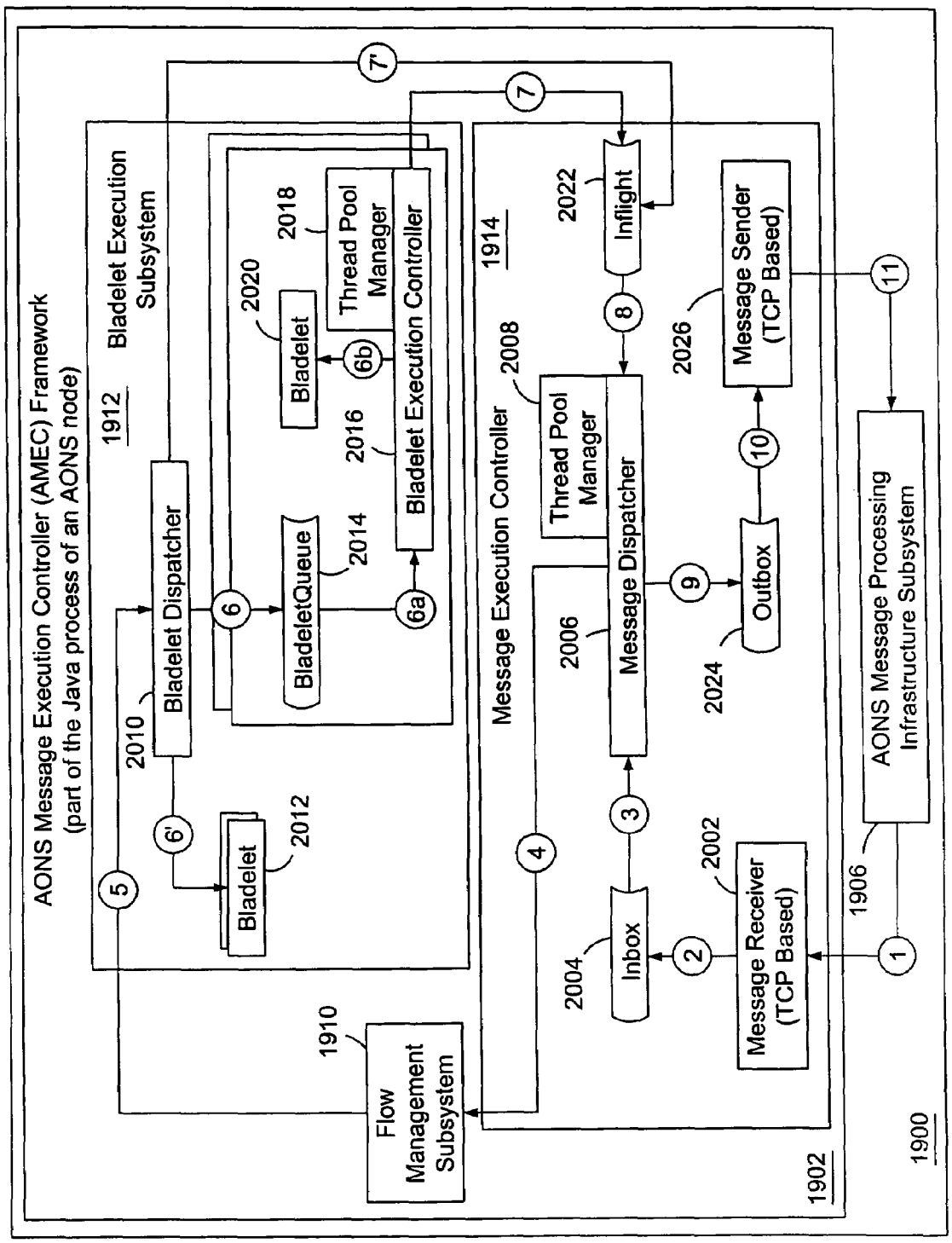
FIG. 20 is a diagram that illustrates message processing within AONS node.

FIG. 20 is a diagram that illustrates message processing within AONS node 1900. AMEC framework 1902 is an event-based multi-threaded mechanism to maximize throughput while minimizing latency for messages in the AONS node. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 1902.

In one embodiment, executing the flow comprises executing each step (i.e., bladelet™/action) of the flow. If a bladelet™ is to be run within a separate context, then AMEC framework 1902 may enqueue into bladelet™-specific queues, and, based on thread availability, dequeue appropriate bladelet™ states from each bladelet™ queue.

3.7.10 Flows, Bladelets™, and Scriptlets™

According to one embodiment, flows string together bladelets™ (i.e., actions) to customize message processing logic. Scriptlets™ provide a mechanism for customers and partners to customize or extend native AONS functionality. Some bladelets™ and services may be provided with an AONS node.

3.7.11 AONS Services

As mentioned in the previous section, a set of core services may be provided by AONS to form the underlying foundation of value-added functionality that can be delivered via an AONS node. In one embodiment, these include: Security Services, Standard Compression Services, Delta Compression Services, Caching Service, Message Logging Service, Policy Management Service (Policy Manager), Reliable Messaging Service, Publish/Subscribe Service, Activity Monitoring Service, Message Distribution Service, XML Parsing Service, XSLT Transformation Service, and QoS Management Service. In one embodiment, each AONS core service is implemented within the context of a service framework.

3.7.12 AONS Configuration and Management

In one embodiment, an AONS node is provisioned and configured for a class of application messages, where it enforces the policies that are declaratively defined on behalf of the application end-points, business-domains, security-domains, administrative domains, and network-domains. Furthermore, the AONS node promotes flexible composition and customization of different product functional features by means of configurability and extensibility of different software and hardware sub-systems for a given deployment scenario. Due to the application and network embodiments of the AONS functionality, the AONS architecture framework should effectively and uniformly address different aspects of configurability, manageability, and monitorability of the various system components and their environments.

The AONS Configuration and Management framework is based upon five functional areas ("FCAPS") for network management as recommended by the ISO network management forum. The functional areas include fault management, configuration management, accounting management, performance management, and security management. Fault management is the process of discovering, isolating, and fixing the problems or faults in the AONS nodes. Configuration management is the process of finding and setting up the AONS nodes. Accounting management involves tracking usage and utilization of AONS resources to facilitate their proper usage. Performance management is the process of measuring the performance of the AONS system components and the overall system. Security management controls access to information on the AONS system. Much of the above functionality is handled via proper instrumentation, programming interfaces, and tools as part of the overall AONS solution.

Figure 21:
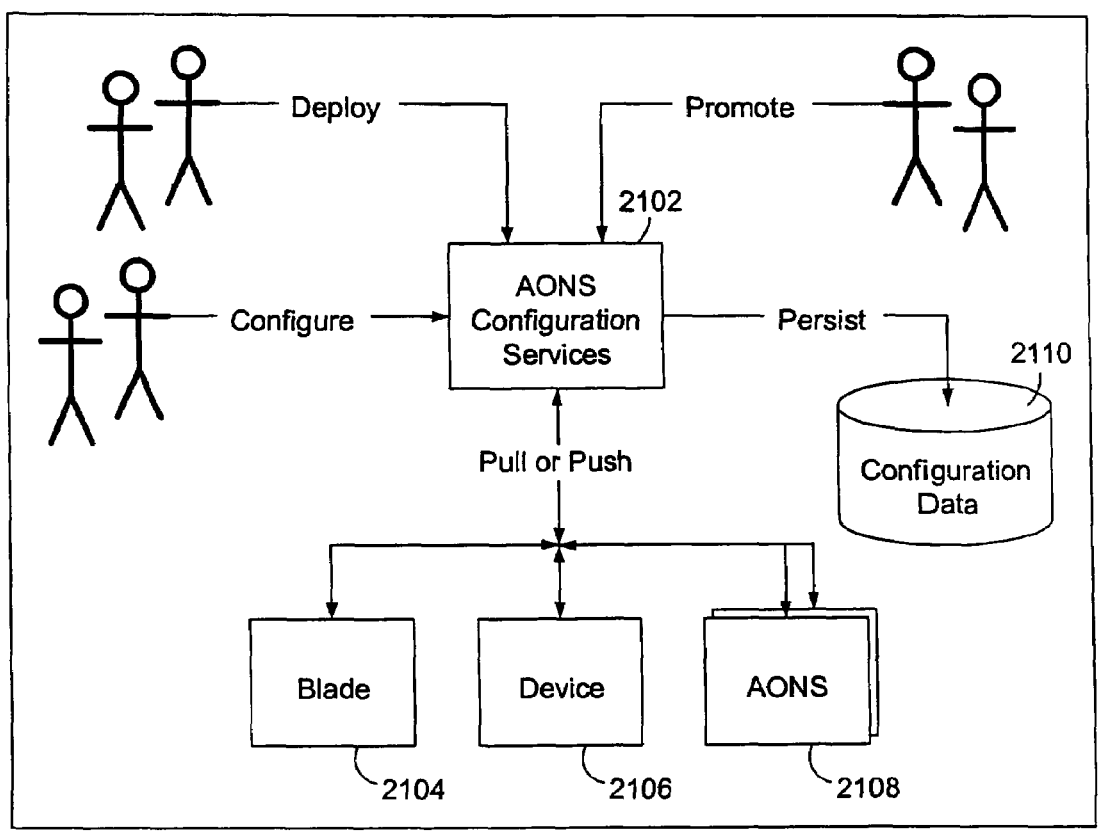
FIG. 21, FIG. 22, and FIG. 23 are diagrams that illustrate entities within an AONS configuration and management framework.
Figure 22:
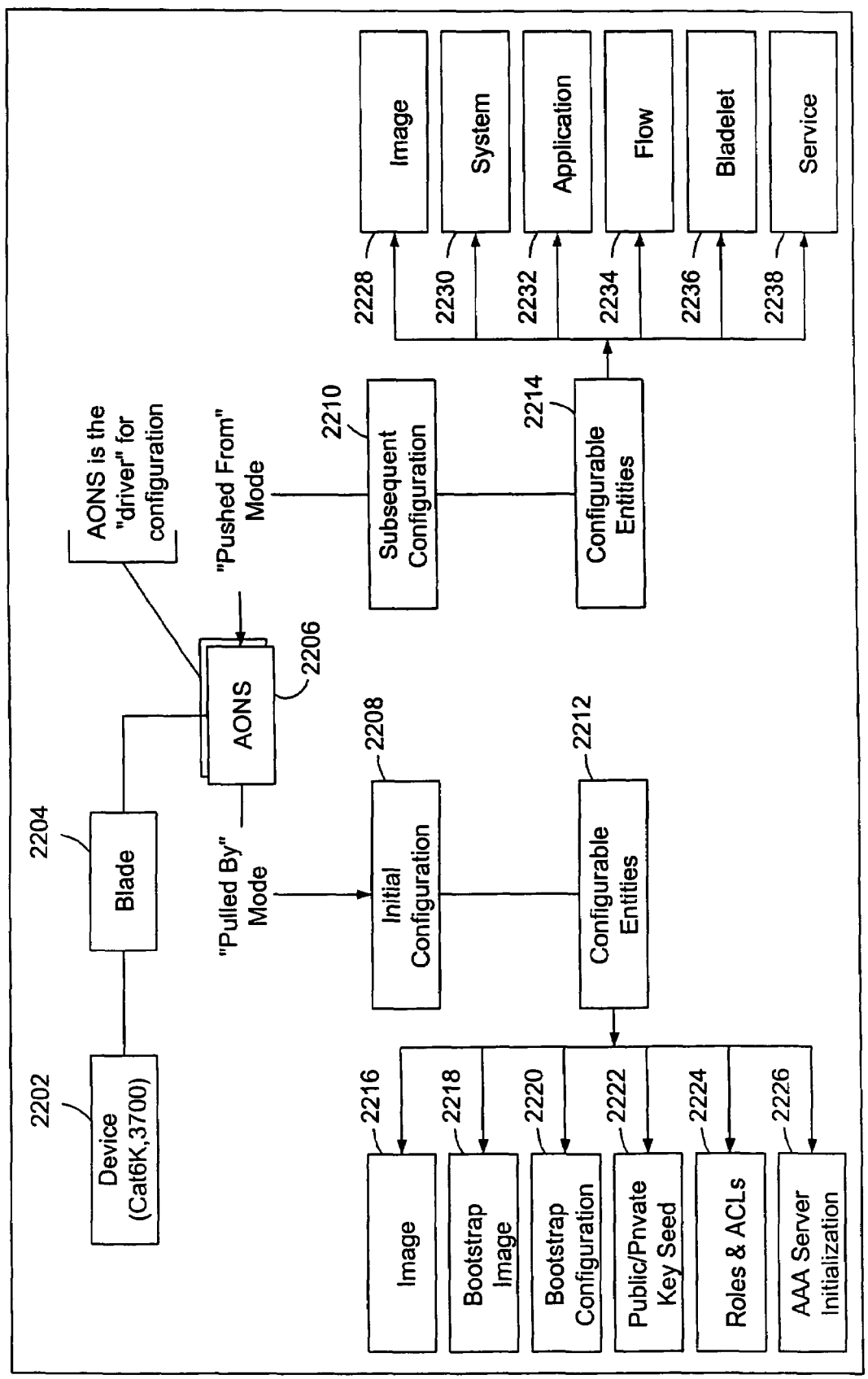
Figure 23:
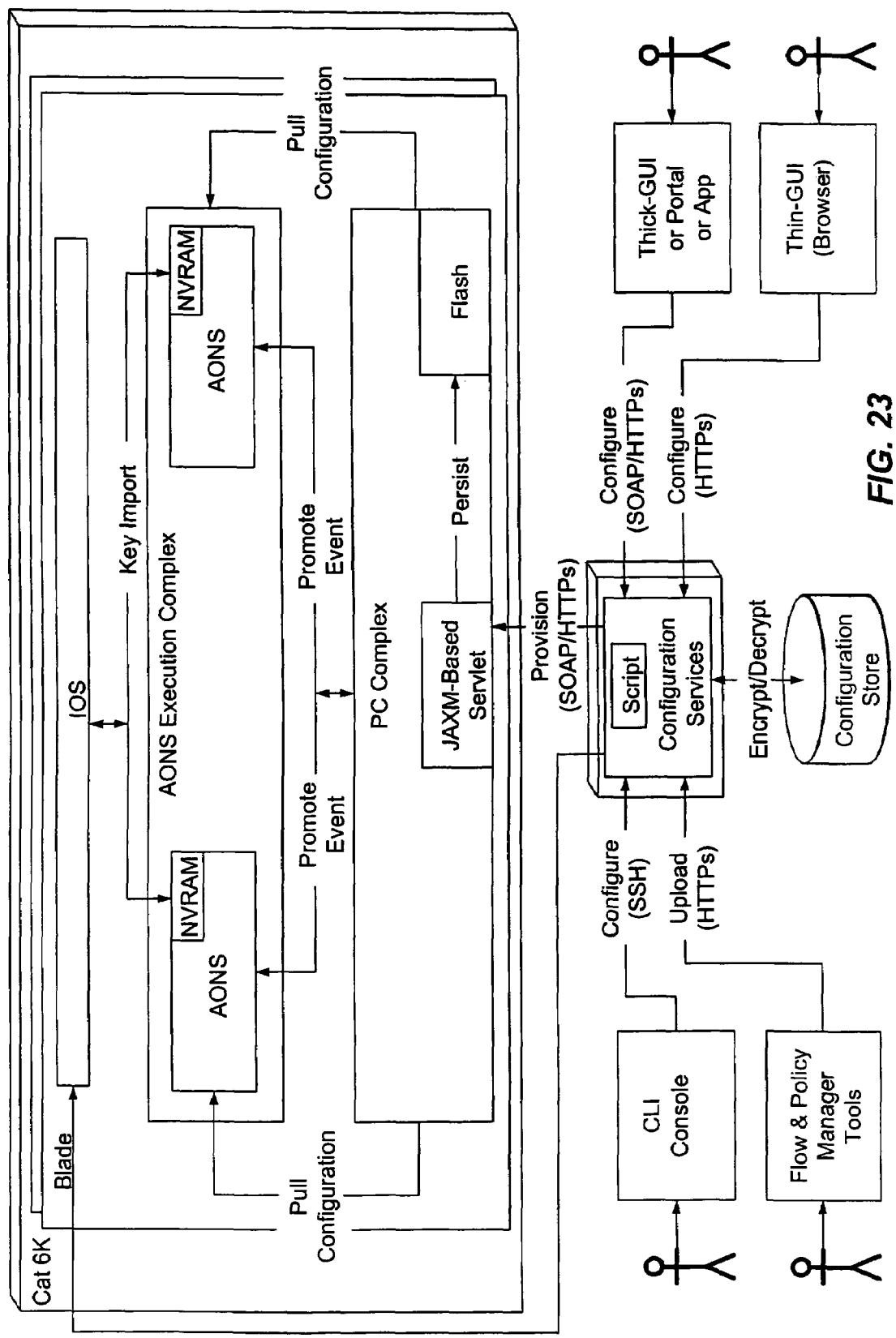

FIG. 21, FIG. 22, and FIG. 23 are diagrams that illustrate entities within an AONS configuration and management framework. A configuring and provisioning server (CPS) is the centralized hub for configuration and management of AONS policies, flows, scriptlets™ and other manageable entities. Configurable data is pushed to the CPS from an AONS design studio (flow tool) and the AONS admin may then provision this data to the production deployment. A promotion process is also provided to test and validate changes via a development to staging/certification to production rollout process. A configuration and provisioning agent (CPA) resides on individual AONS blades and provides the local control and dispatch capabilities for AONS. The CPA interacts with the CPS to get updates. The CPA takes appropriate actions to implement changes. The CPA is also used for collecting monitoring data to report to third party consoles.

3.7.13 AONS Monitoring

Figure 24:
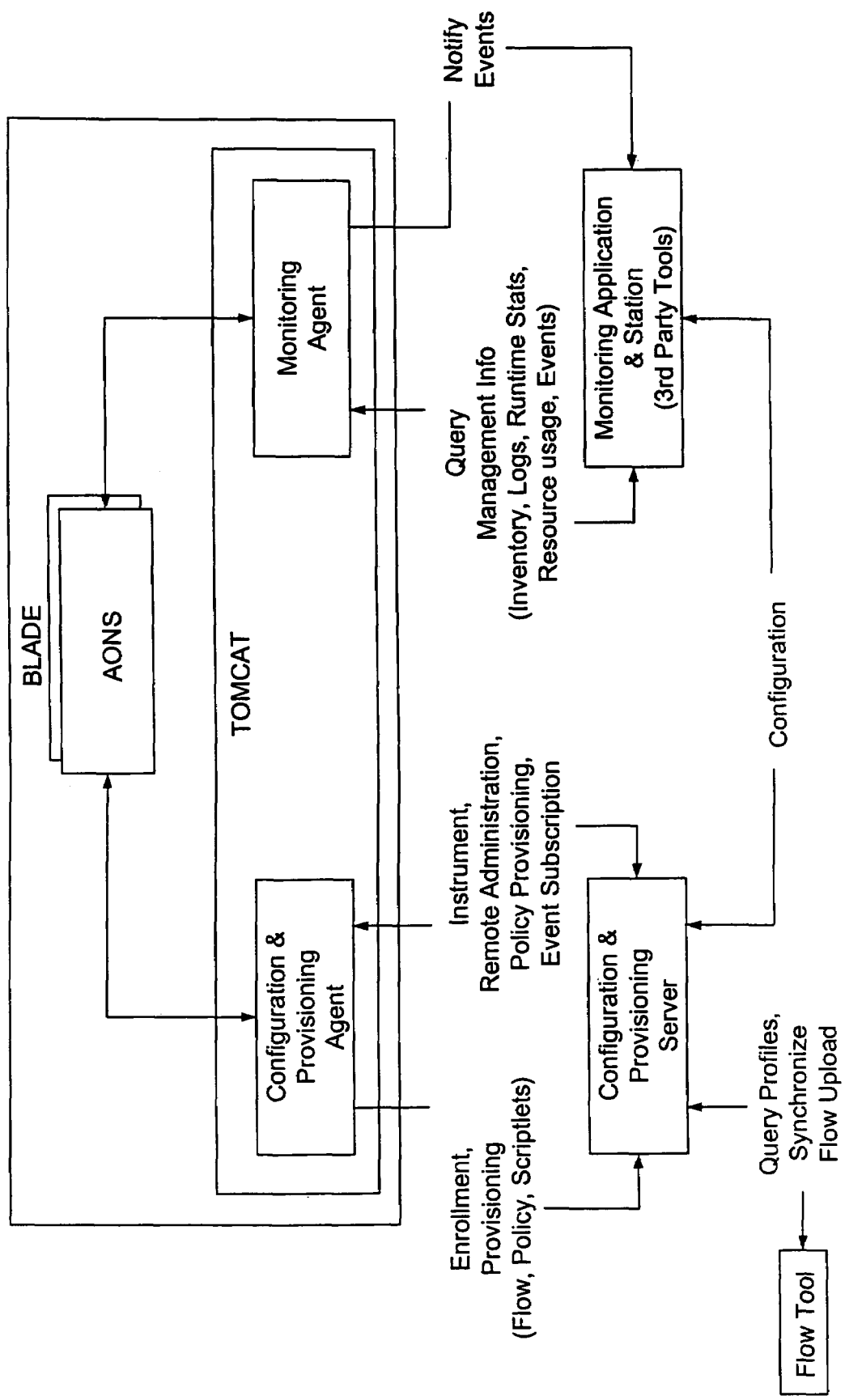
FIG. 24 is a diagram that illustrates an AONS monitoring architecture.

In one embodiment, AONS is instrumented to support well-defined events for appropriate monitoring and visibility into internal processing activities. The monitoring of AONS nodes may be accomplished via a pre-defined JMX MBean agent that is running on each AONS node. This agent communicates with a remote JMX MBean server on the PC complex. An AONS MIB is leveraged for SNMP integration to third party consoles. FIG. 24 is a diagram that illustrates an AONS monitoring architecture.

3.7.14 AONS Tools

In one embodiment, the following tool sets are provided for various functional needs of AONS: a design studio, an admin studio, and a message log viewer. The design studio is a visual tool for designing flows and applying message classification and mapping policies. The admin studio is a web-based interface to perform all administration and configuration functions. The message log viewer is a visual interface to analyze message traffic, patterns, and trace information.

4.0 Implementation Mechanisms—Hardware Overview

Figure 5:
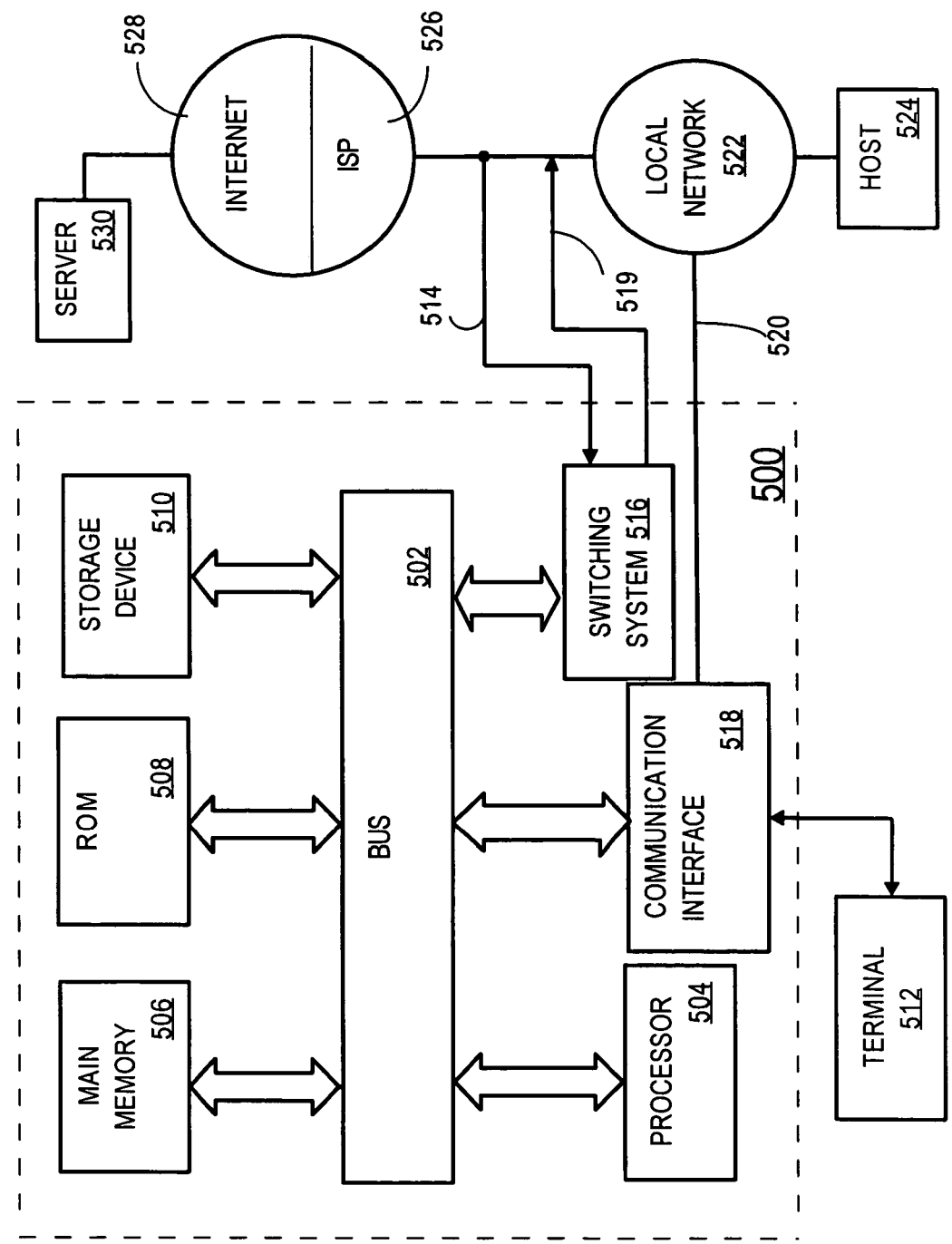
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a proxy device. Thus, in this embodiment, the computer system 500 is a proxy device such as a load balancer.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-322 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for avoiding the storage of client state on computer system 500. According to one embodiment of the invention, computer system 500 provides for such updating in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for avoiding the storage of client state on a server as described herein.

Processor 504 may execute the received code as it is received and/or stored in storage device 510 or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of performing transformation adapter functions in a network element, the method comprising the computer-implemented steps of:
   determining, at the network element, a first application layer message that is contained in one or more payload portions of one or more data packets, wherein the first application layer message conforms to a first application layer protocol;
   determining the first application layer protocol;
   selecting, based on the first application layer protocol, a first adapter from among a plurality of adapters that are accessible to the network element; and
   wherein the first application layer protocol is one of a plurality of different application layer protocols and wherein each of the adapters is configured to transform a different one of the plurality of application layer protocols into a canonical protocol;
   providing the first application layer message as input to the first adapter, wherein the first adapter converts the first application layer message into a second message that does not conform to the first application layer protocol.

2. A method as recited in claim 1, further comprising:
   intercepting the one or more data packets at the network element, wherein the one or more data packets are destined for an application that is hosted on a device other than the network element.

3. A method as recited in claim 1, further comprising:
   reading the first application layer message from a data repository that is external to the network element, wherein the first application layer message was stored in the data repository by an application that is hosted on a device other than the network element.

4. A method as recited in claim 3, wherein the data repository is a message queue, and wherein reading the first application layer message comprises:
   determining whether the message queue contains any application layer messages; and
   in response to determining that the message queue contains an application layer message, reading the first application layer message from the message queue and removing the first application layer message from the message queue.

5. A method as recited in claim 1, further comprising:
   reading the first application layer message from a transmission queue into which are stored application layer messages that an application sends to a message queue alias, wherein the message queue alias appears to the application to be a remote destination message queue from which a remote destination application reads application layer messages, and wherein the transmission queue is separate from the remote destination message queue.

6. A method as recited in claim 5, further comprising:
   converting the second message into a third application layer message that conforms to an application layer protocol; and
   sending the third application layer message toward a broker that stores the third application layer message into the remote destination message queue.

7. A method as recited in claim 1, further comprising:
   determining, based on the second message, a message classification;
   selecting, based on the message classification, a second adapter from among the plurality of adapters; and
   providing the second message as input to the second adapter, wherein the second adapter converts the second message into a third application layer message that conforms to a second application layer protocol.

8. A method as recited in claim 7, wherein the second application layer protocol differs from the first application layer protocol.

9. A method as recited in claim 7, wherein the second adapter sends the third application layer message toward a broker that stores the third application layer message into a destination message queue that is external to the network element and from which a destination application reads application layer messages.

10. A method as recited in claim 1, wherein determining the first application layer protocol comprises:
    determining a Transmission Control Protocol (TCP) port on which the one or more data packets were received; and
    determining, based on mapping information, that the TCP port is associated with the first application layer protocol.

11. A method as recited in claim 1, further comprising:
    receiving, at the network element, program code that implements the first adapter; and
    in response to receiving the program code, storing the program code at the network element.

12. A method as recited in claim 1, further comprising:
    after receiving the one or more data packets, receiving, at the network element, program code that implements a second adapter; and
    in response to receiving the program code, storing the program code at the network element.

13. A method as recited in claim 1, wherein the first adapter converts the first application layer message into the second message by removing, from the first application layer message, information that is specific to the first application layer protocol.

14. A method as recited in claim 1, wherein the first application layer message conforms to Hypertext Transfer Protocol (HTTP), and wherein the second message does not conform to HTTP.

15. A method as recited in claim 1, wherein the first application layer message conforms to IBM MQ protocol, and wherein the second message does not conform to IBM MQ protocol.

16. A method as recited in claim 1, wherein the first application layer message conforms to TIBCO EMS protocol, and wherein the second message does not conform to TIBCO EMS protocol.

17. A method as recited in claim 1, wherein the first application layer message conforms to File Transfer Protocol (FTP), and wherein the second message does not conform to FTP.

18. A method as recited in claim 1, wherein the first application layer message conforms to Simple Mail Transfer Protocol (SMTP), and wherein the second message does not conform to SMTP.

19. A method as recited in claim 1, wherein the network element is a switch or router.

20. A computer-readable volatile or non-volatile storage medium carrying one or more sequences of instructions for performing transformation adapter functions in a network element, which instructions, when executed by one or more processors, cause the one or more processors to carry out the steps of:
   determining, at the network element, a first application layer message that is contained in one or more payload portions of one or more data packets, wherein the first application layer message conforms to a first application layer protocol;
   determining the first application layer protocol;
   selecting, based on the first application layer protocol, a first adapter from among a plurality of adapters that are accessible to the network element; and
   wherein the first application layer protocol is one of a plurality of different application layer protocols and wherein each of the adapters is configured to transform a different one of the plurality of application layer protocols into a canonical protocol;
   providing the first application layer message as input to the first adapter, wherein the first adapter converts the first application layer message into a second message that does not conform to the first application layer protocol.

21. The computer-readable volatile or non-volatile storage medium of claim 20, further comprising sequences of instructions which, when executed by the processor, cause the processor to carry out intercepting the one or more data packets at the network element, wherein the one or more data packets are destined for an application that is hosted on a device other than the network element.

22. The computer-readable volatile or non-volatile storage medium of claim 20, further comprising sequences of instructions which, when executed by the processor, cause the processor to carry out reading the first application layer message from a data repository that is external to the network element, wherein the first application layer message was stored in the data repository by an application that is hosted on a device other than the network element.

23. The computer-readable volatile or non-volatile storage medium of claim 20, further comprising sequences of instructions which, when executed by the processor, cause the processor to carry out reading the first application layer message from a transmission queue into which are stored application layer messages that an application sends to a message aueue alias, wherein the message queue alias appears to the application to be a remote destination message queue from which a remote destination application reads application layer messages, and wherein the transmission queue is separate from the remote destination message queue.

24. The computer-readable volatile or non-volatile storage medium as recited in claim 23, further comprising sequences of instructions which, when executed by the processor, cause the processor to carry out: converting the second message into a third application layer message that conforms to an application layer protocol; and sending the third application layer message toward a broker that stores the third application layer message into the remote destination message queue.

25. The computer-readable volatile or non-volatile storage medium of claim 20, further comprising sequences of instructions which, when executed by the processor, cause the processor to carry out: determining, based on the second message, a message classification;
   selecting, based on the message classification, a second adapter from among the plurality of adapters; and
   providing the second message as input to the second adapter, wherein the second adapter converts the second message into a third application layer message that conforms to a second application layer protocol.

26. The computer-readable volatile or non-volatile storage medium of claim 20, wherein the first adapter converts the first application layer message into the second message by removing, from the first application layer message, information that is specific to the first application layer protocol.

27. The computer-readable volatile or non-volatile storage medium of claim 20, wherein the network element is a switch or router.

28. An apparatus for performing transformation adapter functions in a network element, comprising:
   one or more processors;
   means for determining, at the network element, a first application layer message that is contained in one or more payload portions of one or more data packets, wherein the first application layer message conforms to a first application layer protocol;
   means for determining the first application layer protocol;
   means for selecting, based on the first application layer protocol, a first adapter from among a plurality of adapters that are accessible to the network element; and
   wherein the first application layer protocol is one of a plurality of different application layer protocols and wherein each of the adapters is configured to transform a different one of the plurality of application layer protocols into a canonical protocol;
   means for providing the first application layer message as input to the first adapter, wherein the first adapter converts the first application layer message into a second message that does not conform to the first application layer protocol.

29. An apparatus for performing transformation adapter functions in a network element, comprising:
   a network interface that is coupled to a data network for receiving one or more packet flows therefrom;
   a processor;
   one or more stored sequences of instructions which, when executed by the processor, cause the processor to carry out the steps of:
      determining, at the network element, a first application layer message that is contained in one or more payload portions of one or more data packets, wherein the first application layer message conforms to a first application layer protocol;
      determining the first application layer protocol;
      selecting, based on the first application layer protocol, a first adapter from among a plurality of adapters that are accessible to the network element; and
      wherein the first application layer protocol is one of a plurality of different application layer protocols and wherein each of the adapters is configured to transform a different one of the plurality of application layer protocols into a canonical protocol;

providing the first application layer message as input to the first adapter, wherein the first adapter converts the first application layer message into a second message that does not conform to the first application layer protocol.

30. The apparatus of claim 29, further comprising sequences of instructions which, when executed by the processor, cause the processor to carry out intercepting the one or more data packets at the network element, wherein the one or more data packets are destined for an application that is hosted on a device other than the network element.

31. The apparatus of claim 29, further comprising sequences of instructions which, when executed by the processor, cause the processor to carry out reading the first application layer message from a data repository that is external to the network element, wherein the first application layer message was stored in the data repository by an application that is hosted on a device other than the network element.

32. The apparatus of claim 29, further comprising sequences of instructions which, when executed by the processor, cause the processor to carry out reading the first application layer message from a transmission queue into which are stored application layer messages that an application sends to a message queue alias, wherein the message queue alias appears to the application to be a remote destination message queue from which a remote destination application reads application layer messages, and wherein the transmission queue is separate from the remote destination message queue.

33. A method as recited in claim 32, further comprising sequences of instructions which, when executed by the processor, cause the processor to carry out:
converting the second message into a third application layer message that conforms to an application layer protocol; and
sending the third application layer message toward a broker that stores the third application layer message into the remote destination message queue.

34. The apparatus of claim 29, further comprising sequences of instructions which, when executed by the processor, cause the processor to carry out:
determining, based on the second message, a message classification;
selecting, based on the message classification, a second adapter from among the plurality of adapters; and
providing the second message as input to the second adapter, wherein the second adapter converts the second message into a third application layer message that conforms to a second application layer protocol.

35. The apparatus of claim 29, wherein the first adapter converts the first application layer message into the second message by removing, from the first application layer message, information that is specific to the first application layer protocol.

36. The apparatus of claim 29, wherein the network element is a switch or router.

* * * * *

UNITED STATES PATENT AND TRADEMARK OFFICE
CERTIFICATE OF CORRECTION

| | | |
|---|---|---|
| PATENT NO. | : 7,509,431 B2 | Page 1 of 1 |
| APPLICATION NO. | : 10/991792 | |
| DATED | : March 24, 2009 | |
| INVENTOR(S) | : Pravin Singhal | |

It is certified that error appears in the above-identified patent and that said Letters Patent is hereby corrected as shown below:

In Claim 23 at column 35, line 56: Delete "aueue" and insert therefor --queue--

Signed and Sealed this

Seventh Day of July, 2009

JOHN DOLL
*Acting Director of the United States Patent and Trademark Office*